US012362115B2

(12) United States Patent
Fukuda et al.

(10) Patent No.: US 12,362,115 B2
(45) Date of Patent: Jul. 15, 2025

(54) VACUUM INTERRUPTER

(71) Applicant: MEIDENSHA CORPORATION, Tokyo (JP)

(72) Inventors: Hideaki Fukuda, Numazu (JP); Noboru Sakurai, Numazu (JP); Hiroki Narita, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/715,441

(22) PCT Filed: Dec. 1, 2022

(86) PCT No.: PCT/JP2022/044307
§ 371 (c)(1),
(2) Date: May 31, 2024

(87) PCT Pub. No.: WO2023/100963
PCT Pub. Date: Jun. 8, 2023

(65) Prior Publication Data

US 2025/0029800 A1 Jan. 23, 2025

(30) Foreign Application Priority Data

Dec. 2, 2021 (JP) ................................ 2021-195849
May 30, 2022 (JP) ................................ 2022-087321

(51) Int. Cl.
*H01H 33/664* (2006.01)
*H01H 33/662* (2006.01)

(52) U.S. Cl.
CPC .... *H01H 33/664* (2013.01); *H01H 33/66207* (2013.01)

(58) Field of Classification Search
CPC .......... H01H 33/664; H01H 33/66207; H01H 33/66261; H01H 2033/66269; H01H 2033/66276; H01H 2033/66292
(Continued)

(56) References Cited

U.S. PATENT DOCUMENTS 3,185,800 A * 5/1965 Titus ................ H01H 33/66261 218/136
3,792,214 A * 2/1974 Voshall ............ H01H 33/66261 218/136
(Continued)

FOREIGN PATENT DOCUMENTS

JP S52-128569 A 10/1977
JP S53-041662 U 4/1978
(Continued)

*Primary Examiner* — William A Bolton
(74) *Attorney, Agent, or Firm* — Foley & Lardner LLP

(57) ABSTRACT

An arc shield with which a tubular body of a vacuum container is provided includes a tubular arc-shield body portion interposed between a fixed-side insulating portion and a movable-side insulating portion; a tubular arc shield fixed-side extension portion extending from the arc-shield body portion on the axially fixed side along the inner peripheral side of the fixed-side insulating portion; and a tubular arc shield movable-side extension portion extending from the arc-shield body portion on the axially movable side along the inner peripheral side of the movable-side insulating portion. Further, at least one of the arc shield fixed-side extension portion and the arc shield movable-side extension portion is shaped such that the portion becomes smaller in diameter in a stepped manner in the direction of extension thereof.

14 Claims, 12 Drawing Sheets

(58) Field of Classification Search
USPC .......................................... 218/139, 134, 137
See application file for complete search history.

(56) References Cited

U.S. PATENT DOCUMENTS

| | | | | |
|---|---|---|---|---|
| 4,006,331 | A * | 2/1977 | Crouch ............ | H01H 33/66261 218/136 |
| 4,081,640 | A | 3/1978 | Rich | |
| 4,088,860 | A * | 5/1978 | Abe ................. | H01H 33/66261 218/136 |
| 4,361,742 | A * | 11/1982 | Kashiwagi ....... | H01H 33/66261 218/136 |
| 6,891,122 | B2 * | 5/2005 | Renz ................ | H01H 33/66261 218/136 |
| 8,445,804 | B2 * | 5/2013 | Schellekens ..... | H01H 33/66261 218/139 |
| 8,698,034 | B2 * | 4/2014 | Ryu ................. | H01H 33/66261 218/136 |
| 2016/0104590 | A1 | 4/2016 | Campbell et al. | |
| 2023/0118133 | A1 | 4/2023 | Fukuda | |

FOREIGN PATENT DOCUMENTS

| | | | |
|---|---|---|---|
| JP | S54-056173 | U | 4/1979 |
| JP | S55-014299 | U | 1/1980 |
| JP | S56-117444 | U | 9/1981 |
| JP | 2003-317583 | A | 11/2003 |
| JP | 2004-235121 | A | 8/2004 |
| JP | 2021-036548 | A | 3/2021 |
| JP | 2021-150260 | A | 9/2021 |

* cited by examiner

VACUUM INTERRUPTER

TECHNICAL FIELD

The present invention relates to a vacuum interrupter applicable to various systems such as an electric power facility.

BACKGROUND ART

Various electric power facilities employ vacuum circuit breakers such as one including a built-in vacuum interrupter as a current breaker. Vacuum interrupters are recently expected to become applicable to further high voltage power systems, and are under consideration for various improvements to achieve intended characteristics such as an insulation performance. For example, see Patent Document 1.

FIG. 12 shows a known vacuum interrupter marked by a reference numeral 9. Vacuum interrupter 9 includes an insulative tubular body 90 including a vacuum container 91. Vacuum container 91 includes a first end and a second end, i.e., a fixed-side end and a movable-side end, in a direction of an axis of tubular body 90 (hereinafter, simply referred to as the axial direction). The fixed-side end is sealed by a fixed-side flange 91*a*. The movable-side end is sealed by a movable-side flange 91*b*. Tubular body 90 further includes a fixed-side insulation section 9*a*, a movable-side insulation section 9*b*, and an arc shield 9*c* each of which is shaped tubular. Fixed-side insulation section 9*a*, movable-side insulation section 9*b*, and arc shield 9*c* are arranged continuously and coaxially such that arc shield 9*c* is interposed between fixed-side insulation section 9*a* and movable-side insulation section 9*b*.

Inside vacuum container 91, fixed-side flange 91*a* is provided with a fixed-side conduction shaft 92*a* extending in the axial direction from an inner periphery of vacuum container 91. Fixed-side conduction shaft 92*a* includes an end supporting a fixed electrode 93*a*. Movable-side flange 91*b* is provided with a movable-side conduction shaft 92*b* extending in the axial direction through movable-side flange 91*b*.

Movable-side conduction shaft 92*b* is supported by the inner periphery of vacuum container 91 at movable-side flange 91*b*, via a bellows 92*c* structured expandable in the axial direction. This allows movable-side conduction shaft 92*b* to move in the axial direction. Movable-side conduction shaft 92*b* includes an end supporting a movable electrode 93*b*. The axial movement of movable-side conduction shaft 92*b* causes movable electrode 93*b* (in detail, a contact 93 of movable electrode 93*b*) to contact with and separate from fixed electrode 93*a*.

Vacuum interrupters as described above employ various shields for improvement of characteristics such as dielectric strength and electric field relaxation effect. For example, a shield for electric field relaxation at a so-called triple point (i.e., a boundary point among three materials different from each other in relative dielectric constant) is employed.

In case of FIG. 12, arc shield 9*c* includes an arc shield body 94, a fixed-side extension 94*a*, and a movable-side extension 94*b*. Arc shield body 94 is interposed between fixed-side insulation section 9*a* and movable-side insulation section 9*b*. Fixed-side extension 94*a* extends from a fixed-side end of arc shield body 94 to the fixed side in the axial direction, along an inner periphery of fixed-side insulation section 9*a*. Movable-side extension 94*b* extends from a movable-side end of arc shield body 94 to the movable side in the axial direction, along an inner periphery of movable-side insulation section 9*b*. Fixed-side insulation section 9*a* and movable-side insulation section 9*b* respectively include an electric field relaxation shield 95*a* and an electric field relaxation shield 95*b*.

Furthermore, for achieving a high-voltage vacuum interrupter, it is considered to facilitate sharing of voltage exerted on a tubular body. Balance of the voltage sharing may be maintained by adjusting capacitance by, for example, appropriately setting shapes and arrangement of shields and appropriately setting a distance between a pair of shields adjacent to each other (hereinafter, simply referred to as adjacent shields) in a radial direction of a vacuum container (hereinafter, simply referred to as the radial direction) and a distance between a shield and an insulation section adjacent to each other (hereinafter, simply referred to as a shield and an insulation section).

PRIOR ART DOCUMENT(S)

Patent Document(s)

Patent Document 1: JP 2021-150260 A

SUMMARY OF THE INVENTION

Problem(s) to be Solved by the Invention

Under a condition that a vacuum interrupter has a limited interior volume, capacitance of the vacuum interrupter can be increased by: (i) decreasing a distance between adjacent shields and/or a distance between a shield and an insulation section; (ii) increasing a shield(s) in diameter; and/or (iii) increasing an overlap distance in the axial direction (hereinafter, simply referred to as overlap distance) between adjacent shields and/or an overlap distance between a shield and an insulation section.

However, in the configurations as shown in FIG. 12, these methods (i) to (iii) may shorten a distance between tips (hereinafter, referred to as opposite tips) of shields (hereinafter, referred to as opposite shields) being close to each other in shield diameter and extending in directions opposite to each other, such as fixed-side extension 94*a* and electric field relaxation shield 95*a*, or movable-side extension 94*b* and electric field relaxation shield 95*b*. The opposite tips shortened in distance therebetween are likely to increase a strength of electric field therebetween and thereby increase a risk of creeping discharge.

The distance between the opposite tips can be lengthened by, for example, increasing a difference between the shield diameters of the opposite shields. However, such increase in difference between shield diameters of opposite shields causes one of the opposite shields to decrease in shield diameter and thereby increase in distance to a corresponding insulation section, in case that each of the opposite shields (e.g., fixed-side extension 94*a* and electric field relaxation shield 95*a*) closely overlaps with the corresponding insulation section (e.g., fixed-side insulation section 9*a* or movable-side insulation section 9*b*). This may complicate achievement of an intended capacitance.

In view of the foregoing technical problems, it is desirable to provide an art that serves to facilitate suppression of creeping discharge and achievement of an intended capacitance.

For solving the foregoing technical problems, a vacuum interrupter according to one aspect of the present invention includes: a vacuum container including: a tubular body being insulative; a fixed-side end and a movable-side end wherein fixed and movable sides are sides of first and second ends of the tubular body in an axial direction of the tubular body; and a fixed-side flange closing the fixed-side end and a movable-side flange closing the movable-side end; a fixed-side conduction shaft extending in the axial direction from a center of the fixed-side flange inside the vacuum container; a fixed electrode supported by an end of the fixed-side conduction shaft in an extending direction of the fixed-side conduction shaft; a movable-side conduction shaft that extends in the axial direction through a center of the movable-side flange, and is supported inside the vacuum container by the movable-side flange via a bellows structured expandable, and is structured movable in the axial direction; and a movable electrode that is supported by an end of the movable-side conduction shaft inside the vacuum container so as to face the fixed electrode, and is structured to contact with and separate from the fixed electrode due to movement of the movable-side conduction shaft.

The tubular body includes: an arc shield surrounding circumferences of the fixed electrode and the movable electrode; a fixed-side insulation section shaped tubular and coaxially connected to the arc shield from the fixed side in the axial direction; and a movable-side insulation section shaped tubular and coaxially connected to the arc shield from the movable side in the axial direction.

The vacuum container includes: a fixed-side electric field relaxation shield that is shaped tubular, and extends from a rim of the fixed-side flange inside the vacuum container to the movable side in the axial direction along an inner periphery of the fixed-side insulation section; and a movable-side electric field relaxation shield that is shaped tubular, and extends from a rim of the movable-side flange inside the vacuum container to the fixed side in the axial direction along an inner periphery of the movable-side insulation section.

The arc shield includes: an arc shield body shaped tubular and interposed between the fixed-side insulation section and the movable-side insulation section; an arc shield fixed-side extension that is shaped tubular, and extends from a fixed-side end of the arc shield body to the fixed side in the axial direction, along the inner periphery of the fixed-side insulation section; and an arc shield movable-side extension that is shaped tubular, and extends from a movable-side end of the arc shield body to the movable side in the axial direction, along the inner periphery of the movable-side insulation section.

One of the arc shield fixed-side extension and the arc shield movable-side extension decreases in diameter to form a step as going in an extending direction of the one, and includes an arc shield diameter-decreasing part positioned apart from the arc shield body in the extending direction of the one in the axial direction.

One of the arc shield fixed-side extension and the arc shield movable-side extension may include a plurality of the arc shield diameter-decreasing parts.

One of the arc shield fixed-side extension and the arc shield movable-side extension may include an end of a tip part in the extending direction thereof, wherein the end of the tip part is bent outwardly in a radial direction of the tubular body.

One of the fixed-side electric field relaxation shield and the movable-side electric field relaxation shield may include a tip part decreasing in diameter to form a step as going in an extending direction thereof and including an end bent inwardly or outwardly in the radial direction of the tubular body.

The arc shield fixed-side extension may be configured to decrease in diameter to form the step as going in the extending direction of the arc shield fixed-side extension, and include a tip part in the extending direction that is inserted in an inner circumferential side with respect to the fixed-side electric field relaxation shield so as to overlap with the fixed-side electric field relaxation shield in the axial direction without contacting with the fixed-side electric field relaxation shield.

The arc shield movable-side extension may be configured to decrease in diameter to form the step as going in the extending direction of the arc shield movable-side extension, and include a tip part in the extending direction that is inserted in an inner circumferential side with respect to the movable-side electric field relaxation shield so as to overlap with the movable-side electric field relaxation shield in the axial direction without contacting with the movable-side electric field relaxation shield.

The movable-side insulation section may include: a movable-side insulator group including insulators shaped tubular and arranged in series in the axial direction; and a movable-side auxiliary shield that is less in diameter than the movable-side insulator group, and is coaxial with the movable-side insulator group, and is supported between adjacent two of the insulators of the movable-side insulator group.

The movable-side auxiliary shield includes: a movable-side auxiliary shield base part that is shaped annular to extend in a circumferential direction along an inner periphery of the movable-side insulator group, and supports the movable-side auxiliary shield between the adjacent two of the insulators of the movable-side insulator group; and a movable-side auxiliary shield extension part that is shaped tubular, and is coaxial with the movable-side auxiliary shield base part, and extends in the axial direction from the movable-side auxiliary shield base part.

The movable-side auxiliary shield extension part includes: a movable-side auxiliary shield small diameter part that is shaped tubular, and extends from an inner periphery of the movable-side auxiliary shield base part to the fixed side in the axial direction; a movable-side auxiliary shield large diameter part that is shaped tubular, and extends from a middle part of the movable-side auxiliary shield base part to the fixed side in the axial direction; and a movable-side auxiliary shield movable-side part that is shaped tubular, and extends from the movable-side auxiliary shield base part to the movable side in the axial direction.

The movable-side auxiliary shield movable-side part may decrease in diameter to form a step as going in an extending direction of the movable-side auxiliary shield movable-side part.

The fixed-side insulation section may include: a fixed-side insulator group including insulators shaped tubular and arranged in series in the axial direction; and a fixed-side auxiliary shield that is less in diameter than the fixed-side insulator group, and is coaxial with the fixed-side insulator group, and is supported between adjacent two of the insulators of the fixed-side insulator group.

The fixed-side auxiliary shield includes: a fixed-side auxiliary shield base part that is shaped annular to extend in a circumferential direction along an inner periphery of the fixed-side insulator group, and supports the fixed-side auxiliary shield between the adjacent two of the insulators of the fixed-side insulator group; and a fixed-side auxiliary shield extension part that is shaped tubular, and is coaxial with the fixed-side auxiliary shield base part, and extends in the axial direction from the fixed-side auxiliary shield base part.

The fixed-side auxiliary shield extension part includes: a fixed-side auxiliary shield small diameter part that is shaped tubular, and extends from an inner periphery of the fixed-side auxiliary shield base part to the movable side in the axial direction; a fixed-side auxiliary shield large diameter part that is shaped tubular, and extends from a middle part of the fixed-side auxiliary shield base part to the movable side in the axial direction; and a fixed-side auxiliary shield fixed-side part that is shaped tubular, and extends from the fixed-side auxiliary shield base part to the fixed side in the axial direction.

The fixed-side auxiliary shield fixed-side part may decrease in diameter to form a step as going in an extending direction of the fixed-side auxiliary shield fixed-side part.

The insulators of the movable-side insulator group may be equal to or greater in number than the insulators of the fixed-side insulator group.

The arc shield movable-side extension may be configured to decrease in diameter to form the step as going in the extending direction of the arc shield movable-side extension, and include a tip part in the extending direction that is inserted between an outer periphery of the movable-side auxiliary shield small diameter part and an inner periphery of the movable-side auxiliary shield large diameter part so as to overlap with the movable-side auxiliary shield small diameter part and the movable-side auxiliary shield large diameter part in the axial direction without contacting with them.

The arc shield fixed-side extension may be configured to decrease in diameter to form the step as going in the extending direction of the arc shield fixed-side extension, and include a tip part in the extending direction that is inserted between an outer periphery of the fixed-side auxiliary shield small diameter part and an inner periphery of the fixed-side auxiliary shield large diameter part so as to overlap with the fixed-side auxiliary shield small diameter part and the fixed-side auxiliary shield large diameter part in the axial direction without contacting with them.

The vacuum container may include: a fixed-side adjustment shield that is shaped tubular, and is disposed between the fixed-side conduction shaft and the fixed-side electric field relaxation shield inside the vacuum container, and extends from the fixed-side flange to the movable side in the axial direction; and a movable-side adjustment shield that is shaped tubular, and is disposed between the movable-side conduction shaft and the movable-side electric field relaxation shield inside the vacuum container, and extends from the movable-side flange to the fixed side in the axial direction.

One of the fixed-side adjustment shield and the movable-side adjustment shield may increase in diameter to form a step as going in an extending direction thereof.

According to another aspect of the present invention, a vacuum container includes: a tubular body being insulative; a fixed-side end and a movable-side end wherein fixed and movable sides are sides of first and second ends of the tubular body in an axial direction of the tubular body; and a fixed-side flange closing the fixed-side end and a movable-side flange closing the movable-side end; a fixed-side conduction shaft extending in the axial direction from a center of the fixed-side flange inside the vacuum container; a fixed electrode supported by an end of the fixed-side conduction shaft in an extending direction of the fixed-side conduction shaft; a movable-side conduction shaft that extends in the axial direction through a center of the movable-side flange, and is supported inside the vacuum container by the movable-side flange via a bellows structured expandable, and is structured movable in the axial direction; and a movable electrode that is supported by an end of the movable-side conduction shaft inside the vacuum container so as to face the fixed electrode, and is structured to contact with and separate from the fixed electrode due to movement of the movable-side conduction shaft.

The tubular body includes: an arc shield surrounding circumferences of the fixed electrode and the movable electrode; a fixed-side insulation section shaped tubular and coaxially connected to the arc shield from the fixed side in the axial direction; and a movable-side insulation section shaped tubular and coaxially connected to the arc shield from the movable side in the axial direction.

The vacuum container includes: a fixed-side electric field relaxation shield that is shaped tubular, and extends from a rim of the fixed-side flange inside the vacuum container to the movable side in the axial direction along an inner periphery of the fixed-side insulation section; and a movable-side electric field relaxation shield that is shaped tubular, and extends from a rim of the movable-side flange inside the vacuum container to the fixed side in the axial direction along an inner periphery of the movable-side insulation section.

The arc shield includes: an arc shield body shaped tubular and interposed between the fixed-side insulation section and the movable-side insulation section; an arc shield fixed-side extension that is shaped tubular, and extends from a fixed-side end of the arc shield body to the fixed side in the axial direction, along the inner periphery of the fixed-side insulation section; and an arc shield movable-side extension that is shaped tubular, and extends from a movable-side end of the arc shield body to the movable side in the axial direction, along the inner periphery of the movable-side insulation section.

The movable-side insulation section includes: a movable-side insulator group including insulators shaped tubular and arranged in series in the axial direction; and a movable-side auxiliary shield that is less in diameter than the movable-side insulator group, and is coaxial with the movable-side insulator group, and is supported between adjacent two of the insulators of the movable-side insulator group. The movable-side auxiliary shield includes: a movable-side auxiliary shield base part that is shaped annular to extend in a circumferential direction along an inner periphery of the movable-side insulator group, and supports the movable-side auxiliary shield between the adjacent two of the insulators of the movable-side insulator group; and a movable-side auxiliary shield extension part that is shaped tubular, and is coaxial with the movable-side auxiliary shield base part, and extends in the axial direction from the movable-side auxiliary shield base part.

The movable-side auxiliary shield extension part includes: a movable-side auxiliary shield fixed-side part that is shaped tubular, and extends from the movable-side auxiliary shield base part to the fixed side in the axial direction; and a movable-side auxiliary shield movable-side part that is shaped tubular, and extends from the movable-side auxiliary shield base part to the movable side in the axial direction.

The movable-side auxiliary shield movable-side part includes a tip part directed to the movable side in the axial direction, wherein the tip part directed to the movable side includes: a movable-side diameter-decreasing part that is bent inwardly in a radial direction of the tubular body from the tip part directed to the movable side, and is shaped annular, and extends in the circumferential direction along an inner periphery of the tip part directed to the movable side; and a movable-side reversal extension part that is shaped tubular, and extends from an inner periphery of the movable-side diameter-decreasing part to the fixed side in the axial direction.

The fixed-side insulation section may include: a fixed-side insulator group including insulators shaped tubular and arranged in series in the axial direction; and a fixed-side auxiliary shield that is less in diameter than the fixed-side insulator group, and is coaxial with the fixed-side insulator group, and is supported between adjacent two of the insulators of the fixed-side insulator group. The fixed-side auxiliary shield includes: a fixed-side auxiliary shield base part that is shaped annular to extend in a circumferential direction along an inner periphery of the fixed-side insulator group, and supports the fixed-side auxiliary shield between the adjacent two of the insulators of the fixed-side insulator group; and a fixed-side auxiliary shield extension part that is shaped tubular, and is coaxial with the fixed-side auxiliary shield base part, and extends in the axial direction from the fixed-side auxiliary shield base part.

The fixed-side auxiliary shield extension part includes: a fixed-side auxiliary shield movable-side part that is shaped tubular, and extends from the fixed-side auxiliary shield base part to the movable side in the axial direction; and a fixed-side auxiliary shield fixed-side part that is shaped tubular, and extends from the fixed-side auxiliary shield base part to the fixed side in the axial direction.

The fixed-side auxiliary shield fixed-side part includes a tip part directed to the fixed side in the axial direction, wherein the tip part directed to the fixed side includes: a fixed-side diameter-decreasing part that is bent inwardly in a radial direction of the tubular body from the tip part directed to the fixed side, and is shaped annular, and extends in the circumferential direction along an inner periphery of the tip part directed to the fixed side; and a fixed-side reversal extension part that is shaped tubular, and extends from an inner periphery of the fixed-side diameter-decreasing part to the movable side in the axial direction.

The movable-side reversal extension part may include a tip part directed to the fixed side in the axial direction and inserted in an inner circumferential side with respect to the arc shield movable-side extension so as to overlap with the arc shield movable-side extension in the axial direction without contacting with the arc shield movable-side extension.

The fixed-side reversal extension part may include a tip part directed to the movable side in the axial direction and inserted in an inner circumferential side with respect to the arc shield fixed-side extension so as to overlap with the arc shield fixed-side extension in the axial direction without contacting with the arc shield fixed-side extension.

The movable-side auxiliary shield fixed-side part may be configured to decrease in diameter to form a step as going in an extending direction of the movable-side auxiliary shield fixed-side part, and include a tip part in the extending direction that is inserted in an inner peripheral side with respect to the arc shield movable-side extension so as to overlap with the arc shield movable-side extension in the axial direction without contacting with the arc shield movable-side extension.

The fixed-side auxiliary shield movable-side part may be configured to decrease in diameter to form a step as going in an extending direction of the fixed-side auxiliary shield movable-side part, and include a tip part in the extending direction that is inserted in an inner peripheral side with respect to the arc shield fixed-side extension so as to overlap with the arc shield fixed-side extension in the axial direction without contacting with the arc shield fixed-side extension.

The above aspects of the present invention serve to facilitate suppression of creeping discharge and achievement of an intended capacitor.

MODE(S) FOR CARRYING OUT THE INVENTION

Figure 1:
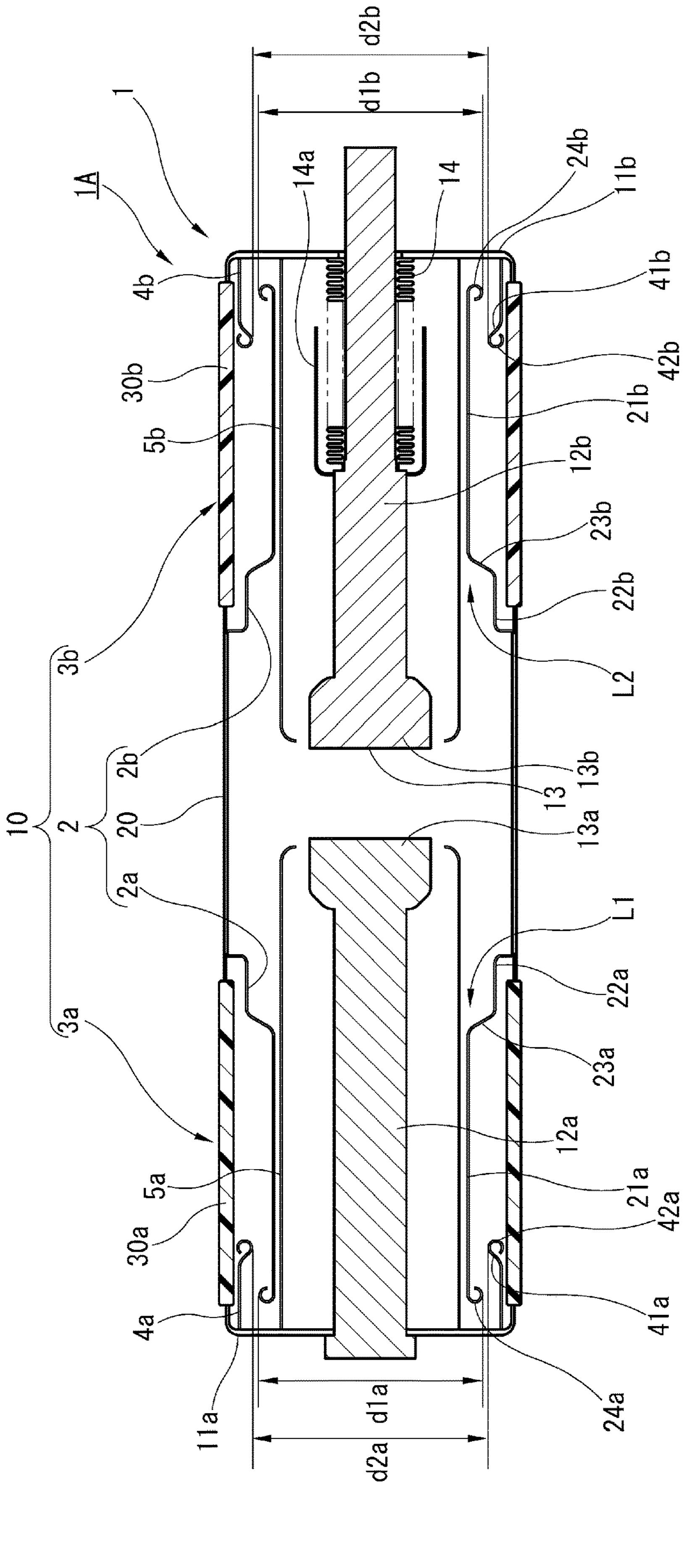
FIG. 1 is a schematic view illustrating configurations of a vacuum interrupter 1A according to a first embodiment, which is a longitudinal sectional view of vacuum interrupter 1A in an axial direction of a vacuum container 1 (i.e., a right-and-left direction in the drawing).

Each of the embodiments of the present invention shows a vacuum interrupter that is definitely different from one configured to merely include a plurality of shields (hereinafter, simply referred to as conventionally configured one).

Specifically, the vacuum interrupter according to each of the present embodiments includes shields including extensions (e.g., an arc shield fixed-side extension, an arc shield movable-side extension, a fixed-side auxiliary shield extension part, and a movable-side auxiliary shield extension part) extending to overlap with insulation sections, wherein at least one of the extensions is shaped to not merely extend in the axial direction but also include a large diameter part and a small diameter part.

As an example of including such a large diameter part and a small diameter part, at least one of an arc shield fixed-side extension and an arc shield movable-side extension (e.g., an arc shield fixed-side extension 2*a* and an arc shield movable-side extension 2*b* described below) extending to overlap with insulation sections (e.g., a fixed-side insulation section 3*a* and a movable-side insulation section 3*b* described below) may be shaped to decrease in diameter to form a step as going in an extending direction of the extension and include an arc shield diameter-decreasing part at a position apart from an arc shield body in the extending direction in the axial direction: in other words, a position between a tip part (i.e., a small diameter part) and a base part (i.e., a large diameter part) of the extension in the extending direction.

Such vacuum interrupter allows a base part of the extension (e.g., the arc shield fixed-side extension or the arc shield movable-side extension) including the arc shield diameter-decreasing part to closely overlap with the insulation section, in opposite shields composed of the arc shield and an electric field relaxation shield. Furthermore, the vacuum interrupter sets a tip part of the extension including the arc shield diameter-decreasing part to be less in diameter than the base part, and thereby serves to secure a sufficient distance between opposite tips of the opposite shields even in case that the arc shield and the electric field relaxation shield being the opposite shields are close to each other. This facilitates suppression of creeping discharge and achievement of an intended capacitance.

The present embodiments may be modified appropriately incorporating common general knowledge of various fields (e.g., a field of vacuum circuit breakers) and/or appropriately referring to prior art documents as needed, provided that a vacuum interrupter is configured such that at least one of extensions (e.g., an arc shield fixed-side extension, an arc shield movable-side extension, a fixed-side auxiliary shield extension part, and a movable-side auxiliary shield extension part) overlapping with insulation sections includes a large diameter part and a small diameter part. The following first to seventh embodiments appropriately omit detailed explanations by representing same contents with same reference numerals.

First Embodiment

FIG. 1 illustrates schematic configurations of a vacuum interrupter 1A according to the first embodiment. Vacuum interrupter 1A includes a vacuum container 1 including a tubular body 10, a fixed-side flange 11*a*, and a movable-side flange 11*b*. Tubular body 10 is insulative, and includes in an axial direction thereof a fixed-side end and a movable-side end that are respectively sealed by fixed-side flange 11*a* and movable-side flange 11*b*.

Tubular body 10 of vacuum container 1 mainly includes an arc shield 2, a fixed-side insulation section 3*a*, and a movable-side insulation section 3*b*. Arc shield 2 is shaped tubular, and surrounds circumferences of a fixed electrode 13*a* and a movable electrode 13*b* described below. Fixed-side insulation section 3*a* includes an insulator 30*a* shaped tubular and connected to arc shield 2 from the axial fixed side. Movable-side insulation section 3*b* includes an insulator 30*b* shaped tubular and connected to arc shield 2 from the axial movable side.

Fixed-side flange 11*a* is provided with a fixed-side conduction shaft 12*a* at a center of fixed-side flange 11*a* inside vacuum container 1. Fixed-side conduction shaft 12*a* is shaped columnar, and extends from the center of fixed-side flange 11*a* inside vacuum container 1 to the axial movable side. Fixed-side conduction shaft 12*a* includes an axial movable-side end (i.e., an extending direction end) supporting a fixed electrode 13*a* shaped flat.

Fixed-side flange 11*a* includes inside vacuum container 1 a rim provided with a fixed-side electric field relaxation shield 4*a* shaped tubular to extend from the rim to the axial movable side along an inner periphery of fixed-side insulation section 3*a*. In case of FIG. 1, inside vacuum container 1, fixed-side flange 11*a* is further provided with a fixed-side adjustment shield 5*a* disposed between fixed-side conduction shaft 12*a* and fixed-side electric field relaxation shield 4*a*. Fixed-side adjustment shield 5*a* is shaped tubular, and extends inside vacuum container 1 from fixed-side flange 11*a* to the axial movable side.

Movable-side flange 11*b* is provided with a movable-side conduction shaft 12*b*. Movable-side conduction shaft 12*b* is shaped columnar, and extends in the axial direction through movable-side flange 11*b*. Movable-side conduction shaft 12*b* is supported inside vacuum container 1 by movable-side flange 11*b* via a bellows 14 that is shaped tubular, structured expandable in the axial direction, and disposed coaxially with movable-side conduction shaft 12*b*. This allows movable-side conduction shaft 12*b* to move in the axial direction. In case of movable-side conduction shaft 12*b* in FIG. 1, bellows 14 has a circumference covered and surrounded by a bellows shield 14*a* shaped tubular. Movable-side conduction shaft 12*b* includes inside vacuum container 1 an end supporting a movable electrode 13*b* shaped flat. Movable electrode 13*b* includes a contact 13 structured to contact with and separate from fixed electrode 13*a* due to axial movement of movable-side conduction shaft 12*b*.

Movable-side flange 11*b* includes inside vacuum container 1 a rim provided with a movable-side electric field relaxation shield 4*b* shaped tubular to extend from the rim to the axial fixed side along an inner periphery of movable-side insulation section 3*b*. In case of FIG. 1, inside vacuum container 1, movable-side flange 11*b* is further provided with a movable-side adjustment shield 5*b* disposed between movable-side conduction shaft 12*b* and movable-side electric field relaxation shield 4*b*. Movable-side adjustment shield 5*b* is shaped tubular, and extends inside vacuum container 1 from movable-side flange 11*b* to the axial fixed side.

Arc shield 2 includes an arc shield body 20, an arc shield fixed-side extension 2*a*, and an arc shield movable-side extension 2*b*. Arc shield body 20 is shaped tubular, and is interposed between fixed-side insulation section 3*a* and movable-side insulation section 3*b*. Arc shield fixed-side extension 2*a* is shaped tubular, and extends from an axial fixed-side end of arc shield body 20 to the axial fixed side along the inner periphery of fixed-side insulation section 3*a*. Arc shield movable-side extension 2*b* is shaped tubular, and extends from an axial movable-side end of arc shield body 20 to the axial movable side along the inner periphery of movable-side insulation section 3*b*.

Arc shield fixed-side extension 2*a* is shaped to decrease in diameter to form a step as going in an extending direction of arc shield fixed-side extension 2*a* (i.e., a direction to the axial fixed side), and includes an arc shield diameter-decreasing part 23*a* between a tip part 21*a* and a base part 22*a* of arc shield fixed-side extension 2*a* in the extending direction thereof. Tip part 21*a* is a small diameter part of arc shield fixed-side extension 2*a*. Base part 22*a* is a large diameter part of arc shield fixed-side extension 2*a*. In case of arc shield fixed-side extension 2*a* in FIG. 1, arc shield diameter-decreasing part 23*a* is positioned apart from arc shield body 20 in the extending direction of arc shield fixed-side extension 2*a* in the axial direction (i.e., positioned to overlap with fixed-side insulation section 3*a*).

Arc shield movable-side extension 2*b* is shaped to decrease in diameter to form a step as going in an extending direction of arc shield movable-side extension 2*b* (i.e., a direction to the axial movable side), and includes an arc shield diameter-decreasing part 23*b* between a tip part 21*b* and a base part 22*b* of arc shield movable-side extension 2*b* in the extending direction thereof. Tip part 21*b* is a small diameter part of arc shield movable-side extension 2*b*. Base part 22*b* is a large diameter part of arc shield movable-side extension 2*b*. In case of arc shield movable-side extension 2*b* in FIG. 1, arc shield diameter-decreasing part 23*b* is positioned apart from arc shield body 20 in the extending direction of arc shield movable-side extension 2*b* in the axial direction (i.e., positioned to overlap with movable-side insulation section 3*b*).

Vacuum interrupter 1A as described above may be variously modified in materials and shapes of components, machining methods and installation methods of components, etc., depending on conditions such as a purpose of use.

For example, out of the components of vacuum interrupter 1A, fixed-side insulation section 3*a* and movable-side insulation section 3*b* may be made of an insulating material such as an alumina ceramics, while the other components may be made of a metallic material such as a stainless steel (SUS304), an oxygen-free copper, or a titanium. It is favorable to appropriately select materials in view of thermal expansion and residual stress that may occur upon installation of the components.

Each shield including arc shield 2 and electric field relaxation shields 4*a* and 4*b* may be produced by machining such as drawing and press working.

For example, as shown in FIG. 1, arc shield fixed-side extension 2*a* may be shaped such that tip part 21*a* in the extending direction of arc shield fixed-side extension 2*a* is inserted in an inner circumferential side with respect to fixed-side electric field relaxation shield 4*a* (i.e., inserted between fixed-side electric field relaxation shield 4*a* and fixed-side adjustment shield 5*a* in case of FIG. 1), and axially overlaps with fixed-side electric field relaxation shield 4*a* (i.e., overlaps with fixed-side electric field relaxation shield 4*a* and fixed-side adjustment shield 5*a* in case of FIG. 1) so as not to contact with fixed-side electric field relaxation shield 4*a*.

Similarly, as shown in FIG. 1, arc shield movable-side extension 2*b* may be shaped such that tip part 21*b* in the extending direction of arc shield movable-side extension 2*b* is inserted in an inner circumferential side with respect to movable-side electric field relaxation shield 4*b* (i.e., inserted between movable-side electric field relaxation shield 4*b* and movable-side adjustment shield 5*b* in case of FIG. 1), and axially overlaps with movable-side electric field relaxation shield 4*b* (i.e., overlaps with movable-side electric field relaxation shield 4*b* and movable-side adjustment shield 5*b* in case of FIG. 1) so as not to contact with movable-side electric field relaxation shield 4*b*.

As shown in FIG. 1, tip parts 21*a* and 21*b* may be shaped to respectively include ends 24*a* and 24*b* bent radially outwardly so as to increase in diameter. This serves to further relax electric field on tip parts 21*a* and 21*b*. In detail, each of ends 24*a* and 24*b* of tip parts 21*a* and 21*b* in FIG. 1 is bent radially outwardly to increase in diameter and warps oppositely to the extending direction of the each of ends 24*a* and 24*b* so as to approach itself.

Figure 2:
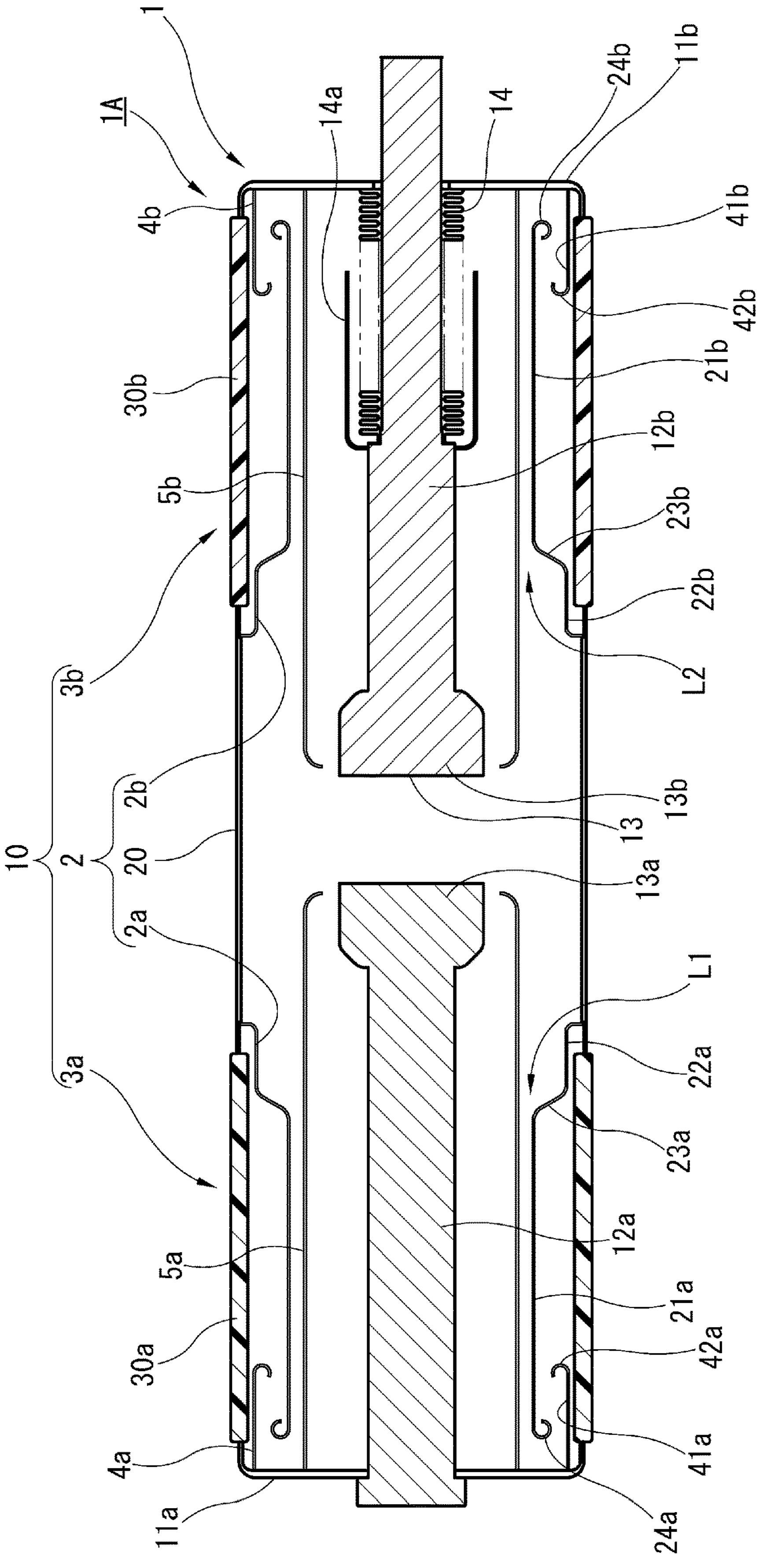
FIG. 2 is a schematic view illustrating configurations of a modification of vacuum interrupter 1A, which is a longitudinal sectional view of vacuum interrupter 1A in the axial direction of vacuum container 1 (i.e., a right-and-left direction in the drawing).

Similarly, tip parts 41*a* and 41*b* of electric field relaxation shields 4*a* and 4*b* may be shaped to respectively include ends 42*a* and 42*b* bent radially outwardly to increase in diameter. However, this favorably requires an appropriate contrivance in case that tip part 41*a* and tip part 41*b* are respectively close to fixed-side insulation section 3*a* and movable-side insulation section 3*b*. Specifically, in case of FIG. 1, each of tip parts 41*a* and 41*b* are shaped to decrease in diameter as going in the extending direction thereof, while each of ends 42*a* and 42*b* is bent radially outwardly. In another manner, as shown in FIG. 2, ends 42*a* and 42*b* of tip parts 41*a* and 41*b* of vacuum interrupter 1A may be bent radially inwardly.

It is favorable that: an outer diameter d1*a* of tip part 21*a* and an inner diameter d2*a* of tip part 41*a* satisfy the following formula (1); and an outer diameter d1*b* of tip part 21*b* and an inner diameter d2*b* of tip part 41*b* satisfy the following formula (2).

$$d1a < d2a \tag{1}$$

$$d1b < d2b \tag{2}$$

The satisfaction of the formulas (1) and (2) facilitates installation avoiding interference between tip part 21*a* and tip part 41*a* and between tip part 21*b* and tip part 41*b* inside vacuum interrupter 1A.

Figure 3:
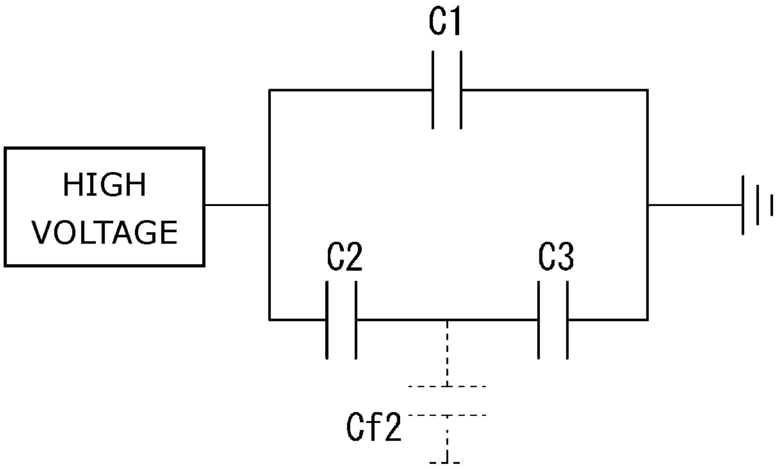
FIG. 3 is an equivalent circuit diagram for illustrating capacitance characteristics in case that vacuum interrupter 1A is contained in a grounding tank of a vacuum circuit breaker.

FIG. 3 shows an equivalent circuit diagram in case that vacuum interrupter 1A is contained in a container such as a grounding tank or a grounding member of a vacuum circuit breaker, wherein the fixed side and the movable side of vacuum interrupter 1A respectively correspond to a high voltage side and a grounding side.

In FIG. 3, Cf2 represents a capacitance between arc shield 2 and the grounding tank. C1 represents a capacitance between fixed electrode 13*a* and movable electrode 13*b*. C2 represents fixed-side conduction shaft 12*a* and arc shield 2. C3 represents movable-side conduction shaft 12*b* and arc shield 2.

FIG. 3 clarifies that capacitances C2 and C3 have to be greater than capacitance Cf2, for suppression of potential variation in arc shield 2. In case of vacuum interrupter 1A in FIG. 1, capacitance C2 can be increased by, for example, shortening a distance between arc shield fixed-side extension 2*a* and fixed-side adjustment shield 5*a* (i.e., a distance between adjacent shields), and/or lengthening an axial dimension of a region L1 in which arc shield fixed-side extension 2*a* and fixed-side adjustment shield 5*a* closely overlap with each other in the axial direction (hereinafter, simply referred to as an overlap region). Capacitance C3 can be increased by, for example, shortening a distance between arc shield movable-side extension 2*b* and movable-side adjustment shield 5*b* (i.e., a distance between adjacent shields), and/or lengthening an axial dimension of an overlap region L2 between arc shield movable-side extension 2_b_ and movable-side adjustment shield 5_b_.

Overlap regions L1 and L2 of vacuum interrupter 1A are respectively shifted to the fixed side and the movable side of vacuum interrupter 1A in the axial direction in comparison with the conventionally configured vacuum interrupter, because arc shield fixed-side extension 2_a_ and arc shield movable-side extension 2_b_ respectively include arc shield diameter-decreasing part 23_a_ and arc shield diameter-decreasing part 23_b_.

Vacuum interrupter 1A according to the first embodiment described above exhibits the following effects. In an axial fixed-side half of vacuum interrupter 1A, arc shield fixed-side extension 2_a_ includes arc shield diameter-decreasing part 23_a_. This allows base part 22_a_ of arc shield fixed-side extension 2_a_ of arc shield fixed-side extension 2_a_ to closely overlap with fixed-side insulation section 3_a_. This serves to shorten a distance from arc shield fixed-side extension 2_a_ to the insulation section, and sufficiently secure an overlap distance of the shield and the insulation section.

Tip part 21_a_ of arc shield fixed-side extension 2_a_ is less in diameter than base part 22_a_. This serves to sufficiently secure a distance between the opposite tips, i.e., a distance from tip part 21_a_ of arc shield fixed-side extension 2_a_ to tip part 41_a_ of fixed-side electric field relaxation shield 4_a_.

Electric field in a vicinity of a surface of fixed-side insulation section 3_a_ is generated between base part 22_a_ of arc shield fixed-side extension 2_a_ and fixed-side electric field relaxation shield 4_a_. This serves to sufficiently secure a distance from the surface of fixed-side insulation section 3_a_ to tip part 21_a_ of arc shield fixed-side extension 2_a_.

As shown in FIGS. 1 and 2, tip part 21_a_ of arc shield fixed-side extension 2_a_ overlaps with fixed-side electric field relaxation shield 4_a_ and fixed-side adjustment shield 5_a_. This serves to increase capacitance in the overlap regions.

The above effects exhibited in the axial fixed-side half of vacuum interrupter 1A are similarly exhibited in an axial movable-side half of vacuum interrupter 1A, explanations of which are omitted.

As described above, vacuum interrupter 1A according to the first embodiment is improved in suppressing creeping discharge and achieving an intended capacitance, in comparison with the conventional configurations. Furthermore, in case of producing an vacuum interrupter with an arbitrary capacitance, the first embodiment facilitates designing of the vacuum interrupter as a high-voltage one, downsizing of the vacuum interrupter, etc., in comparison with the conventional configurations.

FIGS. 1 and 2 show that each of arc shield fixed-side extension 2_a_ and arc shield movable-side extension 2_b_ includes the arc shield diameter-decreasing part (23_a_, 23_b_). However, the first embodiment is not limited to that, but may be modified such that only one of arc shield fixed-side extension 2_a_ and arc shield movable-side extension 2_b_ includes the arc shield diameter-decreasing part: e.g., only the arc shield fixed-side extension 2_a_ includes arc shield diameter-decreasing part 23_a_. In this case, the one of arc shield fixed-side extension 2_a_ and arc shield movable-side extension 2_b_ exhibits the effects of the first embodiment.

Second Embodiment

Figure 4:
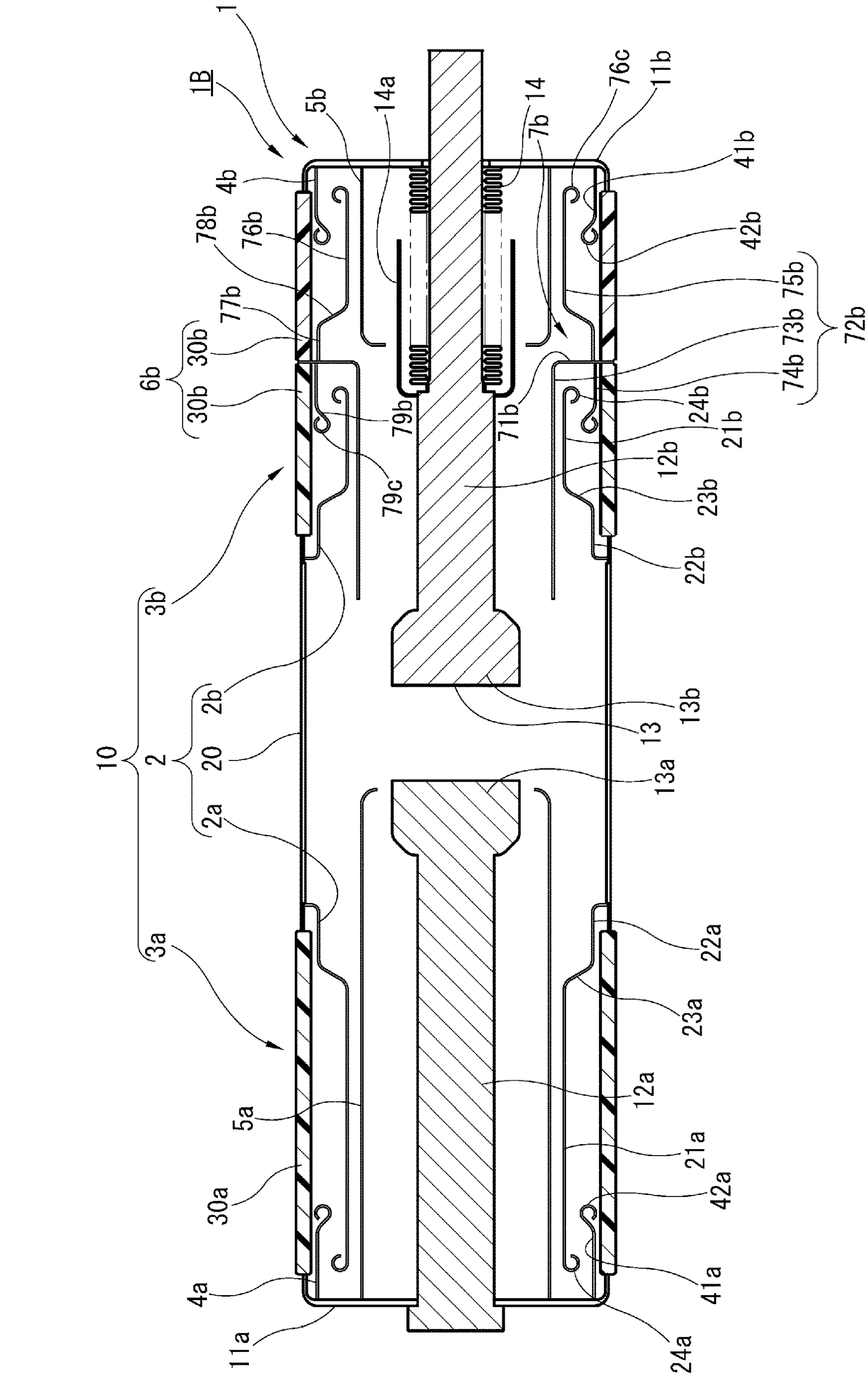
FIG. 4 is a schematic view illustrating configurations of a vacuum interrupter 1B according to a second embodiment, which is a longitudinal sectional view of vacuum interrupter 1B in the axial direction of vacuum container 1 (i.e., a right-and-left direction in the drawing).

FIG. 4 illustrates schematic configurations of an vacuum interrupter 1B according to the second embodiment. Vacuum interrupter 1B is configured similarly to vacuum interrupter 1A, while movable-side insulation section 3_b_ is modified in view of configurations shown in Patent Document 1 (e.g., a reference numeral 23 in Patent Document 1). This facilitates sharing of voltage exerted on tubular body 10, while facilitating suppression of creeping discharge from a shield disposed on movable-side insulation section 3_b_ (i.e., a movable-side auxiliary shield 7_b_ described below) and facilitating achievement of an intended capacitance.

Specifically, movable-side insulation section 3_b_ of vacuum interrupter 1B includes a movable-side insulator group 6_b_ and the movable-side auxiliary shield 7_b_. Movable-side insulator group 6_b_ has a multistage insulation structure composed of a plurality of (e.g. two in FIG. 4) insulators 30_b_ arranged in series in the axial direction. Movable-side auxiliary shield 7_b_ is less in diameter than movable-side insulator group 6_b_, and is supported by movable-side insulator group 6_b_ so as to be coaxial with movable-side insulator group 6_b_.

Movable-side auxiliary shield 7_b_ includes a movable-side auxiliary shield base part 71_b_ and a movable-side auxiliary shield extension part 72_b_. Movable-side auxiliary shield base part 71_b_ is shaped annular, and extends in the circumferential direction along an inner periphery of movable-side insulator group 6_b_, and supports movable-side auxiliary shield 7_b_ between adjacent two of insulators 30_b_. Movable-side auxiliary shield extension part 72_b_ is shaped tubular, and is coaxial with movable-side auxiliary shield base part 71_b_, and extends in the axial direction from movable-side auxiliary shield base part 71_b_.

Movable-side auxiliary shield extension part 72_b_ includes a movable-side auxiliary shield small diameter part 73_b_, a movable-side auxiliary shield large diameter part 74_b_, and a movable-side auxiliary shield movable-side part 75_b_. Movable-side auxiliary shield small diameter part 73_b_ is shaped tubular, and extends from an inner periphery of movable-side auxiliary shield base part 71_b_ to the axial fixed side. Movable-side auxiliary shield large diameter part 74_b_ is shaped tubular, and extends from a middle part (e.g., in FIG. 4, a position close to movable-side insulation section 3_b_) of movable-side auxiliary shield base part 71_b_ to the axial fixed side. Movable-side auxiliary shield movable-side part 75_b_ is shaped tubular, and extends from movable-side auxiliary shield base part 71_b_ (e.g., in FIG. 4, from a position close to movable-side insulation section 3_b_) to the axial movable side.

Movable-side auxiliary shield movable-side part 75_b_ is shaped to decrease in diameter to form a step, as going in an extending direction of movable-side auxiliary shield movable-side part 75_b_. In the extending direction, movable-side auxiliary shield movable-side part 75_b_ includes a tip part 76_b_ and a base part 77_b_, and includes an auxiliary shield diameter-decreasing part 78_b_ between tip part 76_b_ and base part 77_b_.

In case of movable-side auxiliary shield extension part 72_b_ shown in FIG. 4, tip part 76_b_ of movable-side auxiliary shield movable-side part 75_b_ is inserted in an inner circumferential side with respect to movable-side electric field relaxation shield 4_b_ (e.g., in FIG. 4, inserted between an inner periphery of movable-side electric field relaxation shield 4_b_ and an outer periphery of movable-side adjustment shield 5_b_), and overlaps with movable-side electric field relaxation shield 4_b_ (e.g., in FIG. 4, with movable-side electric field relaxation shield 4_b_ and movable-side adjustment shield 5_b_) in the axial direction, so as not to contact with it (or them).

In arc shield movable-side extension 2_b_ shown in FIG. 4, tip part 21_b_ is inserted between an outer periphery of movable-side auxiliary shield small diameter part 73_b_ and an inner periphery of movable-side auxiliary shield large diameter part 74*b*, and overlaps with movable-side auxiliary shield small diameter part 73*b* and movable-side auxiliary shield large diameter part 74*b* in the axial direction, so as to contact with none of them.

As shown in FIG. 4, tip part 76*b* of movable-side auxiliary shield movable-side part 75*b* and tip part 79*b* of movable-side auxiliary shield large diameter part 74*b* respectively include an end 76*c* and an end 79*c* that are bent radially outwardly so as to increase in diameter, for further relaxation of electric field at tip part 76*b* and tip part 79*b*. While end 79*c* is bent radially outwardly, tip part 79*b* is shaped to decrease in diameter as going in an extending direction of tip part 79*b* because of being close to movable-side insulation section 3*b*.

Figure 5:
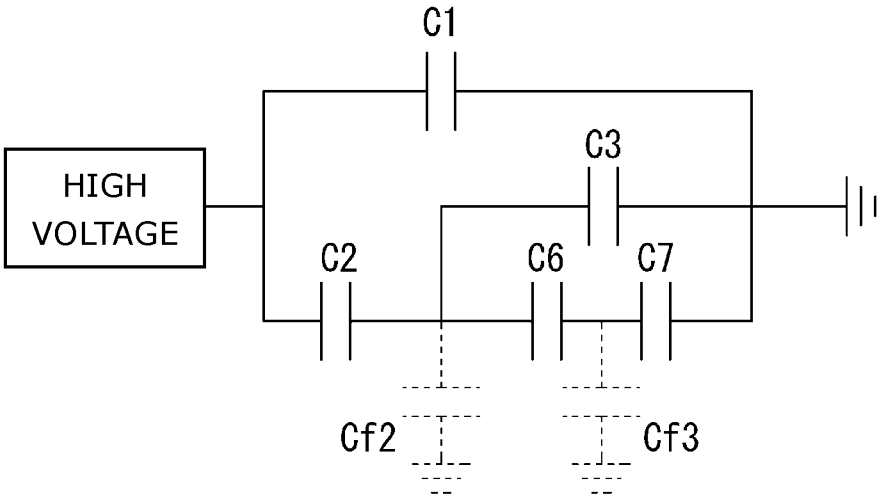
FIG. 5 is an equivalent circuit diagram for illustrating capacitance characteristics in case that vacuum interrupter 1B is contained in a grounding tank of a vacuum circuit breaker.

FIG. 5 shows an equivalent circuit diagram in case that vacuum interrupter 1B is contained in a container such as a grounding tank or a grounding member of a vacuum circuit breaker, wherein the fixed side and the movable side of vacuum interrupter 1B respectively correspond to a high voltage side and a grounding side.

In FIG. 5, Cf3 represents a capacitance between movable-side auxiliary shield 7*b* and the grounding tank. C6 represents a capacitance between arc shield 2 and movable-side auxiliary shield 7*b*. C7 represents a capacitance between movable-side auxiliary shield 7*b* and movable-side conduction shaft 12*b*.

FIG. 5 clarifies that capacitances C2, C3, C6, and C7 have to be greater than capacitances Cf2 and Cf3, for suppression of potential variation in arc shield 2.

Vacuum interrupter 1B according to the second embodiment described above exhibits the following effects, in addition to the effects similar to the first embodiment. First, vacuum interrupter 1B includes movable-side insulation section 3*b* and movable-side auxiliary shield 7*b* in the axial movable-side half. This facilitates sharing of voltage exerted on tubular body 10.

In the axial fixed side, movable-side auxiliary shield extension part 72*b* movable-side auxiliary shield 7*b* branches to movable-side auxiliary shield small diameter part 73*b* and movable-side auxiliary shield large diameter part 74*b*. This forms an overlap region between movable-side auxiliary shield small diameter part 73*b* and movable-side auxiliary shield large diameter part 74*b*, and allows tip part 21*b* of arc shield movable-side extension 2*b* to be inserted therebetween to overlap with them.

A radial distance between movable-side auxiliary shield small diameter part 73*b* and movable-side auxiliary shield large diameter part 74*b* may be appropriately shortened. This serves to suppress influence due to center deviation that is likely to happen upon installation (e.g., upon installation of opposite shields).

In the axial movable side, movable-side auxiliary shield extension part 72*b* of movable-side auxiliary shield 7*b* includes movable-side auxiliary shield movable-side part 75*b* including auxiliary shield diameter-decreasing part 78*b*. This allows tip part 76*b* of movable-side auxiliary shield movable-side part 75*b* to be inserted in the inner circumferential side with respect to movable-side electric field relaxation shield 4*b* and overlap with movable-side electric field relaxation shield 4*b* in order to form the overlap region.

Third Embodiment

Figure 6:
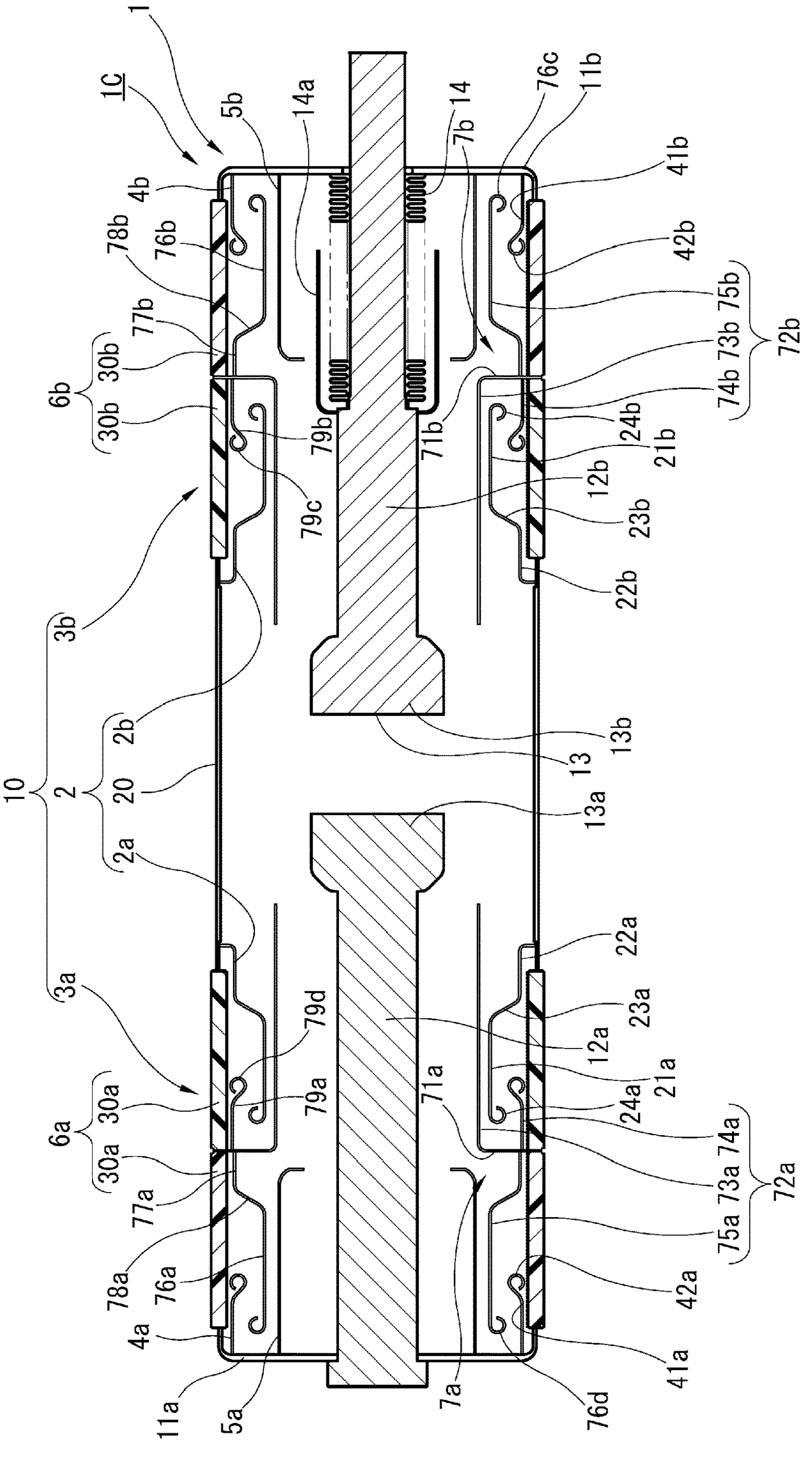
FIG. 6 is a schematic view illustrating configurations of a vacuum interrupter 1C according to a third embodiment, which is a longitudinal sectional view of vacuum interrupter 1C in the axial direction of vacuum container 1 (i.e., a right-and-left direction in the drawing).

FIG. 6 illustrates schematic configurations of a vacuum interrupter 1C according to the third embodiment. Vacuum interrupter 1C is configured similarly to vacuum interrupter 1B, while fixed-side insulation section 3*a* is modified in view of configurations shown in Patent Document 1 (e.g., reference numeral 23 in Patent Document 1). This facilitates sharing of voltage exerted on tubular body 10, while facilitating suppression of creeping discharge from a shield disposed on fixed-side insulation section 3*a* (i.e., a fixed-side auxiliary shield 7*a* described below) and facilitating achievement of an intended capacitance.

Specifically, fixed-side insulation section 3*a* of vacuum interrupter 1C includes a fixed-side insulator group 6*a* and the fixed-side auxiliary shield 7*a*. Fixed-side insulator group 6*a* has a multistage insulation structure composed of a plurality of (e.g. two in FIG. 6) insulators 30*a* arranged in series in the axial direction. Fixed-side auxiliary shield 7*a* is less in diameter than fixed-side insulator group 6*a*, and is supported by fixed-side insulator group 6*a* so as to be coaxial with fixed-side insulator group 6*a*.

Fixed-side auxiliary shield 7*a* includes a fixed-side auxiliary shield base part 71*a* and a fixed-side auxiliary shield extension part 72*a*. Fixed-side auxiliary shield base part 71*a* is shaped annular, and extends in the circumferential direction along an inner periphery of fixed-side insulator group 6*a*, and supports fixed-side auxiliary shield 7*a* between adjacent two of insulators 30*a*. Fixed-side auxiliary shield extension part 72*a* is shaped tubular, and is coaxial with fixed-side auxiliary shield base part 71*a*, and extends in the axial direction from fixed-side auxiliary shield base part 71*a*.

Fixed-side auxiliary shield extension part 72*a* includes a fixed-side auxiliary shield small diameter part 73*a*, a fixed-side auxiliary shield large diameter part 74*a*, and a fixed-side auxiliary shield fixed-side part 75*a*. Fixed-side auxiliary shield small diameter part 73*a* is shaped tubular, and extends from an inner periphery of fixed-side auxiliary shield base part 71*a* to the axial movable side. Fixed-side auxiliary shield large diameter part 74*a* is shaped tubular, and extends from a middle part (e.g., in FIG. 6, a position close to fixed-side insulation section 3*a*) of fixed-side auxiliary shield base part 71*a* to the axial fixed side. Fixed-side auxiliary shield fixed-side part 75*a* is shaped tubular, and extends from fixed-side auxiliary shield base part 71*a* (e.g., in FIG. 6, from a position close to fixed-side insulation section 3*a*) to the axial fixed side.

Fixed-side auxiliary shield fixed-side part 75*a* is shaped to decrease in diameter to form a step, as going in an extending direction of fixed-side auxiliary shield fixed-side part 75*a*. In the extending direction, fixed-side auxiliary shield fixed-side part 75*a* includes a tip part 76*a* and a base part 77*a*, and includes an auxiliary shield diameter-decreasing part 78*a* between tip part 76*a* and base part 77*a*.

In case of fixed-side auxiliary shield extension part 72*a* shown in FIG. 6, tip part 76*a* of fixed-side auxiliary shield fixed-side part 75*a* is inserted in the inner circumferential side with respect to fixed-side electric field relaxation shield 4*a* (e.g., in FIG. 6, inserted between an inner periphery of fixed-side electric field relaxation shield 4*a* and an outer periphery of fixed-side adjustment shield 5*a*), and overlaps with fixed-side electric field relaxation shield 4*a* (e.g., in FIG. 6, with fixed-side electric field relaxation shield 4*a* and fixed-side adjustment shield 5*a*) in the axial direction, so as not to contact with it (or them).

In arc shield fixed-side extension 2*a* shown in FIG. 6, tip part 21*a* is inserted between an outer periphery of fixed-side auxiliary shield small diameter part 73*a* and an inner periphery of fixed-side auxiliary shield large diameter part 74*a*, and overlaps with fixed-side auxiliary shield small diameter part 73*a* and fixed-side auxiliary shield large diameter part 74*a* in the axial direction, so as to contact with none of them.

As shown in FIG. 6, tip part 76*a* of fixed-side auxiliary shield fixed-side part 75*a* and tip part 79*a* of fixed-side auxiliary shield large diameter part 74*a* respectively include an end 76*d* and an end 79*d* that are bent radially outwardly so as to increase in diameter, for further relaxation of electric field at tip part 76*a* and tip part 79*a*. While end 79*d* is bent radially outwardly, tip part 79*a* is shaped to decrease in diameter as going in an extending direction of tip part 79*a* because of being close to fixed-side insulation section 3*a*.

Vacuum interrupter 1C according to the third embodiment described above exhibits the effects similar to the first and second embodiments, and furthermore exhibits the effects similar to the axial movable-side half of vacuum interrupter 1B, also in the axial fixed-side half of vacuum interrupter 1C.

Fourth Embodiment

Figure 7:
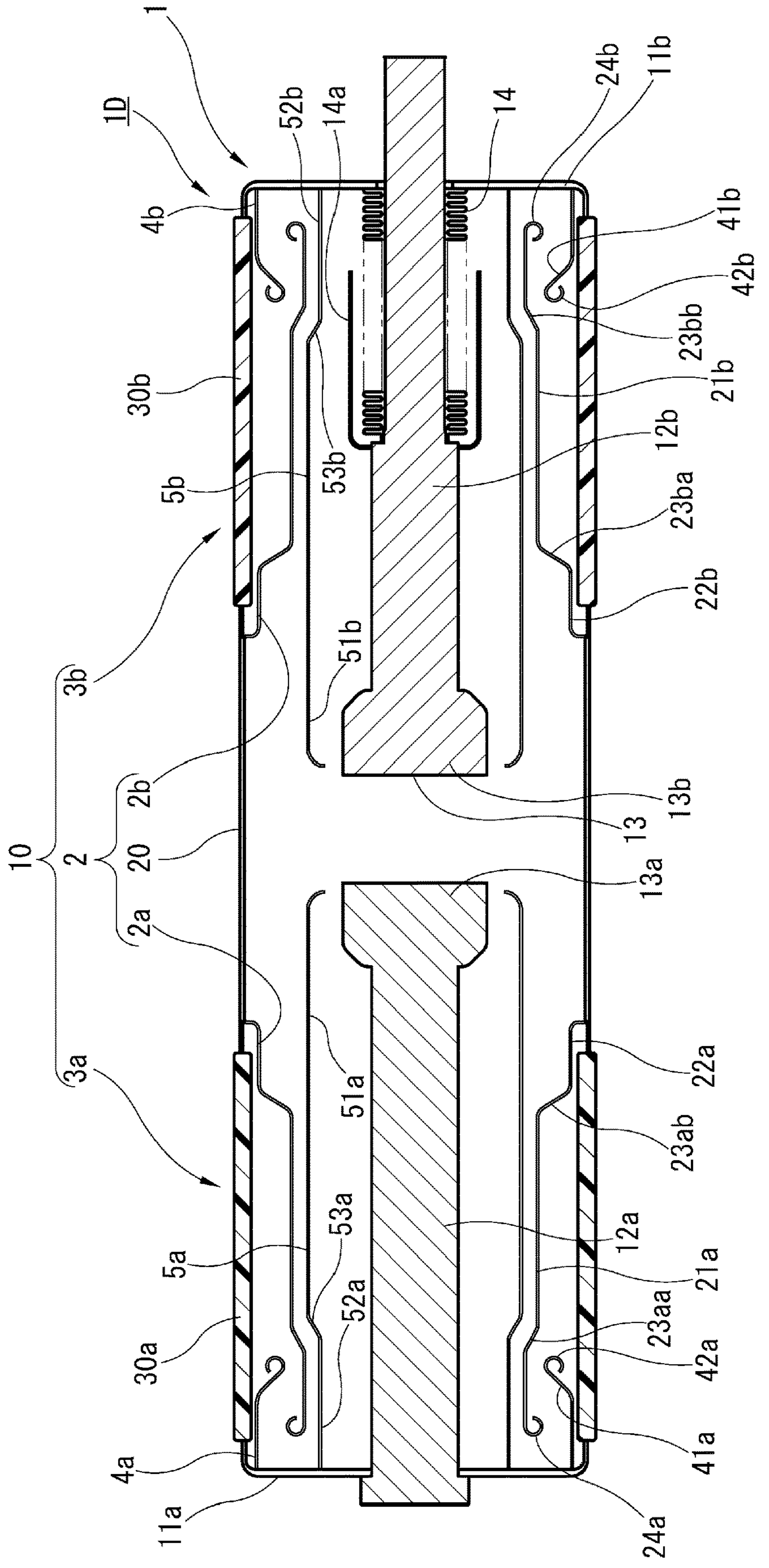
FIG. 7 is a schematic view illustrating configurations of a vacuum interrupter 1D according to a fourth embodiment, which is a longitudinal sectional view of vacuum interrupter 1D in the axial direction of vacuum container 1 (i.e., a right-and-left direction in the drawing).

FIG. 7 illustrates schematic configurations of a vacuum interrupter 1D according to the fourth embodiment. Vacuum interrupter 1D is configured similarly to vacuum interrupter 1A, while each of arc shield fixed-side extension 2*a* and arc shield movable-side extension 2*b* includes a plurality of (e.g., two in FIG. 7) arc shield diameter-decreasing parts (i.e., arc shield diameter-decreasing parts 23*aa* and 23*ab* of arc shield fixed-side extension 2*a* and arc shield diameter-decreasing parts 23*ba* and 23*bb* of arc shield movable-side extension 2*b* described below).

Specifically, as shown in FIG. 7, arc shield fixed-side extension 2*a* of vacuum interrupter 1D includes arc shield diameter-decreasing part 23*aa* positioned adjacently to tip part 21*a* and arc shield diameter-decreasing part 23*ab* positioned adjacently to base part 22*a* (i.e., positioned similarly to arc shield diameter-decreasing part 23*a* shown in FIG. 1).

Arc shield movable-side extension 2*b* of vacuum interrupter 1D includes arc shield diameter-decreasing part 23*bb* positioned adjacently to tip part 21*b* and arc shield diameter-decreasing part 23*ba* positioned adjacently to base part 22*b* (i.e., positioned similarly to arc shield diameter-decreasing part 23*b* shown in FIG. 1).

Tip part 41*a* of fixed-side electric field relaxation shield 4*a* and tip part 41*b* of movable-side electric field relaxation shield 4*b* are respectively shaped to decrease in diameter as extending, and respectively include end 42*a* and end 42*b* that are bent radially outwardly. Tip parts 41*a* and 41*b* in case of FIG. 7 are shaped to decrease in diameter at greater inclinations and be smaller in diameter than tip parts 41*a* and 41*b* in case of FIG. 1.

Fixed-side adjustment shield 5*a* is shaped to increase in diameter to form a step as going in an extending direction of fixed-side adjustment shield 5*a* (i.e., going to the axial movable side), and includes a tip part 51*a*, a base part 52*a*, and an adjustment shield diameter-decreasing part 53*a* between tip part 51*a* and base part 52*a* in the extending direction. In case of FIG. 7, fixed-side adjustment shield 5*a* extends to the axial movable side along an inner periphery of arc shield fixed-side extension 2*a*, where adjustment shield diameter-decreasing part 53*a* is positioned to face arc shield diameter-decreasing part 23*aa* in the axial direction.

Movable-side adjustment shield 5*b* is shaped to increase in diameter to form a step as going in an extending direction of movable-side adjustment shield 5*b* (i.e., going to the axial fixed side), and includes a tip part 51*b*, a base part 52*b*, and an adjustment shield diameter-decreasing part 53*b* between tip part 51*b* and base part 52*b* in the extending direction. In case of FIG. 7, movable-side adjustment shield 5*b* extends to the axial fixed side along an inner periphery of arc shield movable-side extension 2*b*, where adjustment shield diameter-decreasing part 53*b* is positioned to face arc shield diameter-decreasing part 23*bb* in the axial direction.

Vacuum interrupter 1D according to the fourth embodiment described above exhibits the following effects in addition to the effects similar to the first embodiment. In the axial fixed side half, vacuum interrupter 1D includes the plurality of arc shield diameter-decreasing parts 23*aa* and 23*ab*. Accordingly, tip part 21*a* of arc shield fixed-side extension 2*a* is shaped to decrease in diameter more greatly than vacuum interrupter 1A. This facilitates diameter-decreasing of tip part 41*a* of fixed-side electric field relaxation shield 4*a*, and thereby serves to suppress tip part 41*a* from being close to fixed-side insulation section 3*a*.

Fixed-side adjustment shield 5*a* is shaped to increase in diameter as going in the extending direction thereof. This facilitates shaping of fixed-side adjustment shield 5*a* to extend along the inner periphery of arc shield fixed-side extension 2*a*, and thereby serves to shorten a direction between fixed-side adjustment shield 5*a* and arc shield fixed-side extension 2*a* (i.e., a distance between the adjacent shields).

These effects exhibited in the axial fixed side half of vacuum interrupter 1D are similarly exhibited also in the axial movable side half of vacuum interrupter 1D, details of which are omitted.

Fifth Embodiment

Figure 8:
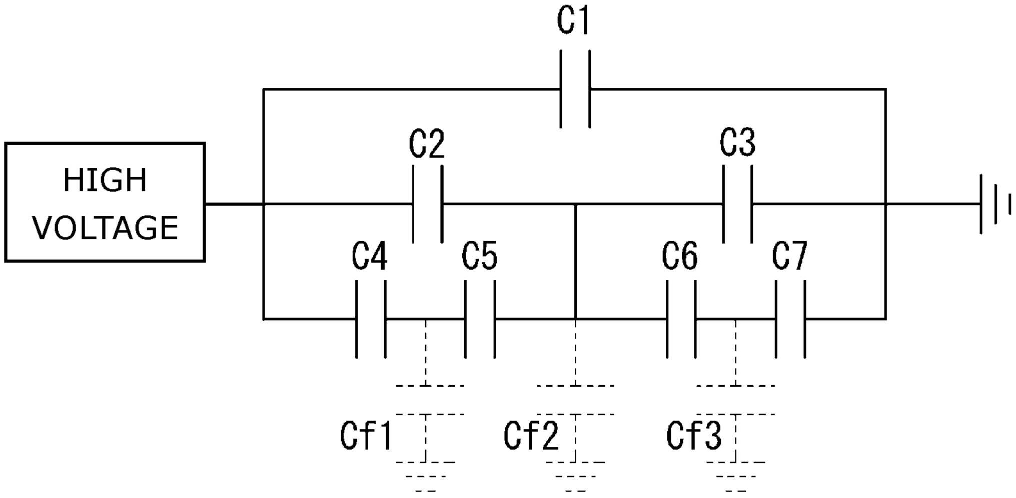
FIG. 8 is an equivalent circuit diagram for illustrating capacitance characteristics in case that vacuum interrupter 1C is contained in a grounding tank of a vacuum circuit breaker.

FIG. 8 shows an equivalent circuit diagram in case that vacuum interrupter 1C, which includes fixed-side auxiliary shield 7*a* and movable-side auxiliary shield 7*b* as shown in FIG. 6, is contained in a container such as a grounding tank or a grounding member of a vacuum circuit breaker, wherein the fixed side and the movable side of vacuum interrupter 1C respectively correspond to a high voltage side and a grounding side.

In FIG. 8, Cf1 represents a capacitance between fixed-side auxiliary shield 7*a* and the grounding tank. C4 represents a capacitance between fixed-side auxiliary shield 7*a* and fixed-side conduction shaft 12*a*. C5 represents a capacitance between arc shield 2 and fixed-side auxiliary shield 7*a*.

The grounding side of the equivalent circuit (i.e., the axial movable side of vacuum interrupter 1C) in FIG. 8 shows that capacitance C6 increases with increase in overlap region between arc shield 2 (in detail, arc shield movable-side extension 2*b*) and movable-side auxiliary shield 7*b*. The grounding side of the equivalent circuit has a resultant capacitance (hereinafter, referred to as a grounding-side resultant capacitance) expressed by the following formula (3), assuming that capacitances C6 and C7 are comparable with each other in value.

[Mathematical Expression 1]

$$\begin{pmatrix}\text{GROUNDING-SIDE}\\ \text{RESULTANT}\\ \text{CAPACITANCE}\end{pmatrix} = \frac{1}{\frac{1}{C_1}+\frac{1}{C_2+\frac{1}{\frac{1}{C_4}+\frac{1}{C_5}}}} + C_3 + \frac{1}{\frac{1}{C_6}+\frac{1}{C_7}} \quad (3)$$

In this formula (3), simple increase in capacitance C6 as described above increases a difference between capacitance C6 and capacitance C7 (i.e., becomes C6>>C7), and increases in dependency on capacitance C7. In such case, the grounding-side resultant capacitance is expressed by the following formula (4).

[Mathematical Expression 2]

$$\begin{pmatrix} \text{GROUNDING-SIDE} \\ \text{RESULTANT} \\ \text{CAPACITANCE} \end{pmatrix} = \frac{1}{\frac{1}{C_1} + \frac{1}{C_2 + \frac{1}{\frac{1}{C_4} + \frac{1}{C_5}}}} + C_3 + C_7 \quad (4)$$

Accordingly, it is important to increase both of capacitances C6 and C7 upon increasing the grounding-side resultant capacitance. Similarly, it is important to not simply increase capacitance C5 but increase both of capacitances C4 and C5 upon increasing a resultant capacitance of the high voltage side (i.e., the axial fixed side of vacuum interrupter 1C) of the equivalent circuit (hereinafter, referred to as a high-voltage-side resultant capacitance).

In case of vacuum interrupter 1C in FIG. 6, capacitance C7 can be increased by, for example, increasing the overlap region between movable-side auxiliary shield movable-side part 75*b* and movable-side electric field relaxation shield 4*b*. However, the vacuum interrupter may increase in size (e.g., increase in radial dimension, axial dimension, etc.) if securing a sufficient distance between the opposite tips of movable-side auxiliary shield movable-side part 75*b* and movable-side electric field relaxation shield 4*b* for suppression of creeping discharge.

Figure 9:
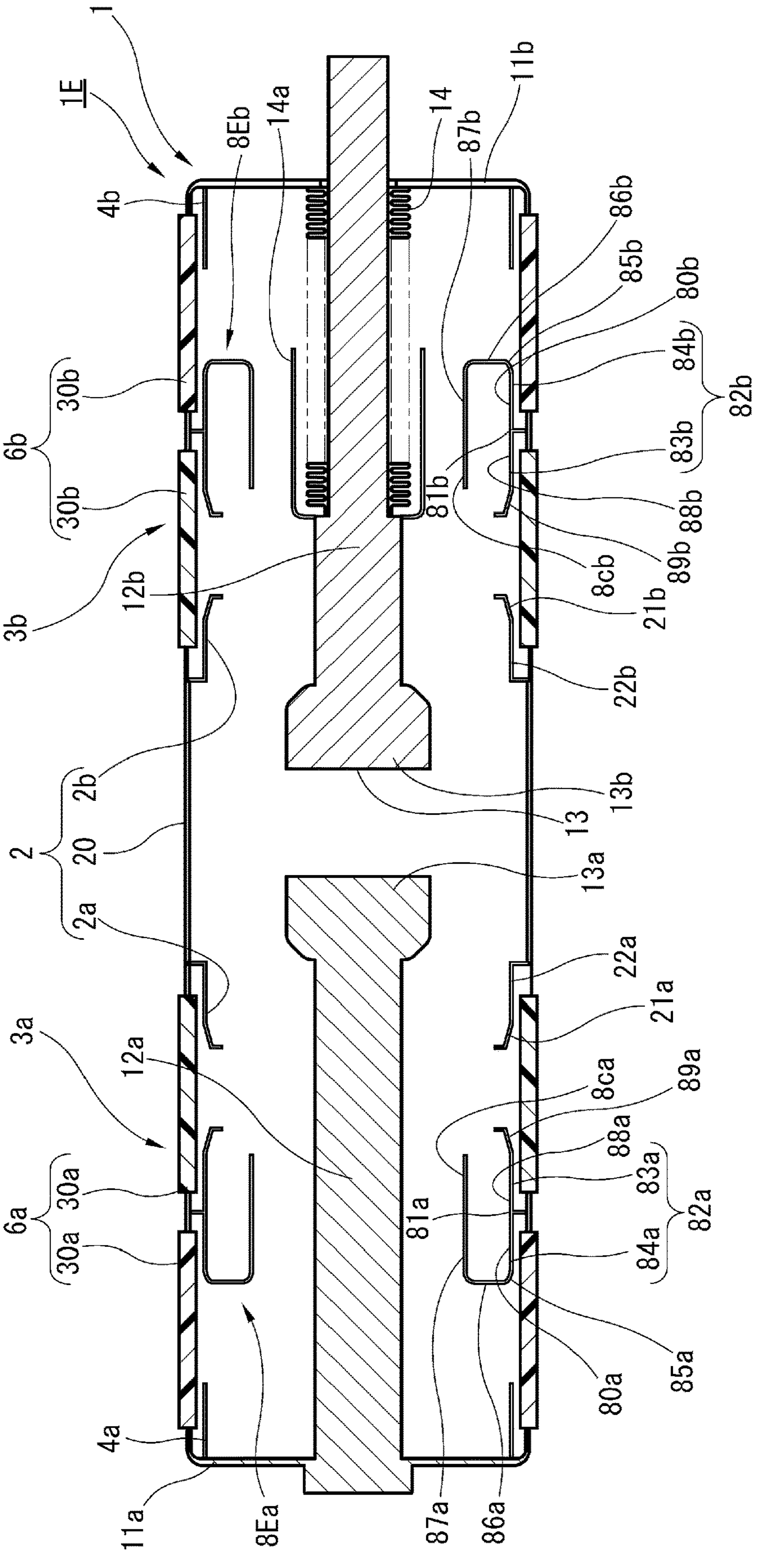
FIG. 9 is a schematic view illustrating configurations of a vacuum interrupter 1E according to a fifth embodiment, which is a longitudinal sectional view of vacuum interrupter 1E in the axial direction of vacuum container 1 (i.e., a right-and-left direction in the drawing).

In view of the foregoing, the fifth embodiment provides a vacuum interrupter 1E shown in FIG. 9. This serves to suppress size-increasing of vacuum interrupter 1E even in case of increasing the grounding-side resultant capacitance and the high-voltage-side resultant capacitance, while facilitating suppression of creeping discharge and achievement of an intended capacitance.

Vacuum interrupter 1E shown in FIG. 9 is configured similarly to vacuum interrupter 1C, while including a fixed-side auxiliary shield 8Ea and a movable-side auxiliary shield 8Eb respectively instead of fixed-side auxiliary shield 7*a* and movable-side auxiliary shield 7*b*.

Specifically, fixed-side auxiliary shield 8Ea includes a fixed-side auxiliary shield base part 81*a* and a fixed-side auxiliary shield extension part 82*a*. Fixed-side auxiliary shield base part 81*a* is shaped annular to extend in the circumferential direction along the inner periphery of fixed-side insulator group 6*a*, and supports fixed-side auxiliary shield 8Ea between adjacent two of insulators 30*a*. Fixed-side auxiliary shield extension part 82*a* is shaped tubular, and is coaxial with fixed-side auxiliary shield base part 81*a*, and extends in the axial direction from fixed-side auxiliary shield base part 81*a*.

Fixed-side auxiliary shield extension part 82*a* includes a fixed-side auxiliary shield movable-side part 83*a* and a fixed-side auxiliary shield fixed-side part 84*a*. Fixed-side auxiliary shield movable-side part 83*a* extends to the axial movable side from an inner periphery of fixed-side auxiliary shield base part 81*a*. Fixed-side auxiliary shield fixed-side part 84*a* extends to the axial fixed side from the inner periphery of fixed-side auxiliary shield base part 81*a*. Fixed-side auxiliary shield movable-side part 83*a* includes a tip part 89*a* facing the axial movable side. Tip part 89*a* is bent radially inwardly, in comparison with a base part 88*a* of fixed-side auxiliary shield movable-side part 83*a*.

Fixed-side auxiliary shield fixed-side part 84*a* includes a tip part 85*a*, a fixed-side diameter-decreasing part 86*a*, and a fixed-side reversal extension part 87*a*. Tip part 85*a* faces the axial fixed side. Fixed-side diameter-decreasing part 86*a* is bent radially inwardly from tip part 85*a*, and is shaped annular to extend in the circumferential direction along an inner periphery of tip part 85*a*. Fixed-side reversal extension part 87*a* is bent to the axial movable side from an inner periphery of fixed-side diameter-decreasing part 86*a*, and is shaped tubular to extend to the axial movable side. Thus, fixed-side auxiliary shield fixed-side part 84*a* includes a base part 80*a* as a large diameter section and fixed-side reversal extension part 87*a* as a small diameter section.

Movable-side auxiliary shield 8Eb includes a movable-side auxiliary shield base part 81*b* and a movable-side auxiliary shield extension part 82*b*. Movable-side auxiliary shield base part 81*b* is shaped annular to extend in the circumferential direction along the inner periphery of movable-side insulator group 6*b*, and supports movable-side auxiliary shield 8Eb between adjacent two of insulators 30*b*. Movable-side auxiliary shield extension part 82*b* is shaped tubular, and is coaxial with movable-side auxiliary shield base part 81*b*, and extends in the axial direction from movable-side auxiliary shield base part 81*b*.

Movable-side auxiliary shield extension part 82*b* includes a movable-side auxiliary shield fixed-side part 83*b* and a movable-side auxiliary shield movable-side part 84*b*. Movable-side auxiliary shield fixed-side part 83*b* extends to the axial fixed side from an inner periphery of movable-side auxiliary shield base part 81*b*. Movable-side auxiliary shield movable-side part 84*b* extends to the axial movable side from the inner periphery of movable-side auxiliary shield base part 81*b*. Movable-side auxiliary shield fixed-side part 83*b* includes a tip part 89*b* facing the axial fixed side. Tip part 89*b* is bent radially inwardly, in comparison with a base part 88*b* of movable-side auxiliary shield fixed-side part 83*b*.

Movable-side auxiliary shield movable-side part 84*b* includes a tip part 85*b*, a movable-side diameter-decreasing part 86*b*, and a movable-side reversal extension part 87*b*. Tip part 85*b* faces the axial movable side. Movable-side diameter-decreasing part 86*b* is bent radially inwardly from tip part 85*b*, and is shaped annular to extend in the circumferential direction along an inner periphery of tip part 85*b*. Movable-side reversal extension part 87*b* is bent to the axial fixed side from an inner periphery of movable-side diameter-decreasing part 86*b*, and is shaped tubular to extend to the axial fixed side. Thus, movable-side auxiliary shield movable-side part 84*b* includes a base part 80*b* as a large diameter section and a movable-side reversal extension part 87*b* as a small diameter section.

Vacuum interrupter 1E configured as described above is not limited to the shape shown in FIG. 9, but may be modified as appropriate. For example, fixed-side reversal extension part 87*a* and movable-side reversal extension part 87*b* may be modified in axial dimension as appropriate, although fixed-side reversal extension part 87*a* and movable-side reversal extension part 87*b* in case of FIG. 9 are designed to respectively overlap with fixed-side auxiliary shield movable-side part 83*a* and movable-side auxiliary shield fixed-side part 83*b*.

Furthermore, vacuum interrupter 1E may be modified, similarly to vacuum interrupter 1C, to include fixed-side adjustment shield 5*a* and movable-side adjustment shield 5*b* and/or include arc shield diameter-decreasing part 23*a* in arc shield fixed-side extension 2*a* and arc shield diameter-decreasing part 23*b* in arc shield movable-side extension 2*b*.

Vacuum interrupter 1E according to the fifth embodiment described above exhibits the following effects in addition to the effects similar to the third embodiment. Fixed-side auxiliary shield 8Ea and movable-side auxiliary shield 8Eb of vacuum interrupter 1E are respectively designed not to axially overlap with fixed-side electric field relaxation shield 4*a* and movable-side electric field relaxation shield 4*b* that respectively form pairs of opposite shields with fixed-side auxiliary shield 8Ea and movable-side auxiliary shield 8Eb. This serves to secure sufficient distances between opposite tips, and facilitates suppression of creeping discharge. This serves to sufficiently suppress size-increasing of vacuum interrupter 1E even in case of increasing the grounding-side resultant capacitance and the high-voltage-side resultant capacitance, and facilitates achievement of an intended capacitance.

In FIG. 9 (and FIGS. 10 and 11 described below), both of fixed-side insulation section 3*a* and movable-side insulation section 3*b* respectively include auxiliary shields (i.e., fixed-side auxiliary shield 8Ea and movable-side auxiliary shield 8Eb in FIG. 9). However, the fifth embodiment is not limited to that. For example, vacuum interrupter 1E may be modified such that only one of fixed-side insulation section 3*a* and movable-side insulation section 3*b* includes the auxiliary shield (e.g., modified to omit one of fixed-side auxiliary shield 8Ea and movable-side auxiliary shield 8Eb), provided that balance between the grounding-side resultant capacitance and the high-voltage-side resultant capacitance is sufficiently maintained. In such case, the effects of the fifth embodiment is exhibited in the one side including the auxiliary shield.

Sixth Embodiment

Figure 10:
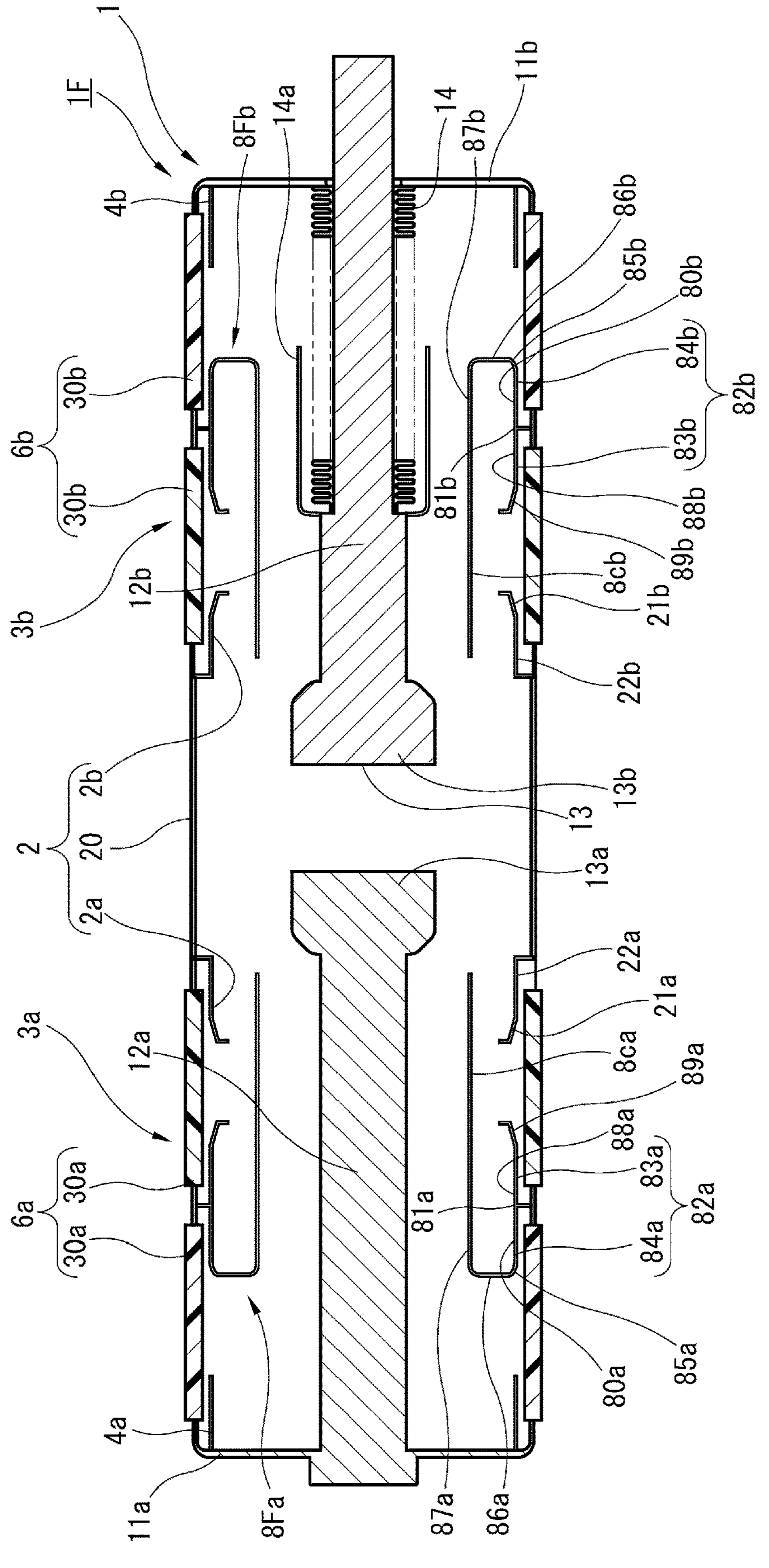
FIG. 10 is a schematic view illustrating configurations of a vacuum interrupter 1F according to a sixth embodiment, which is a longitudinal sectional view of vacuum interrupter 1F in the axial direction of vacuum container 1 (i.e., a right-and-left direction in the drawing).

FIG. 10 illustrates schematic configurations of a vacuum interrupter 1F according to the sixth embodiment. Vacuum interrupter 1F is configured similarly to vacuum interrupter 1E, while including a fixed-side auxiliary shield 8Fa and a movable-side auxiliary shield 8Fb respectively instead of fixed-side auxiliary shield 8Ea and movable-side auxiliary shield 8Eb.

Specifically, fixed-side auxiliary shield 8Fa is configured similarly to fixed-side auxiliary shield 8Ea, while being increased in axial dimension of fixed-side reversal extension part 87*a* of fixed-side auxiliary shield 8Fa. Fixed-side reversal extension part 87*a* includes a tip part 8*ca* directed to the axial movable side and inserted in an inner circumferential side with respect to arc shield fixed-side extension 2*a*. Thus, tip part 8*ca* overlaps with arc shield fixed-side extension 2*a* in the axial direction so as not to contact with it.

Movable-side auxiliary shield 8Fb is configured similarly to movable-side auxiliary shield 8Eb, while being increased in axial dimension of movable-side reversal extension part 87*b* of movable-side auxiliary shield 8Fb. Movable-side reversal extension part 87*b* includes a tip part 8*cb* directed to the axial fixed side and inserted in an inner circumferential side with respect to arc shield movable-side extension 2*b*. Thus, tip part 8*cb* overlaps with arc shield movable-side extension 2*b* in the axial direction so as not to contact with it.

Vacuum interrupter 1F according to the sixth embodiment described above exhibits the following effects in addition to the effects similar to the fifth embodiment. Fixed-side auxiliary shield 8Fa and movable-side auxiliary shield 8Fb of vacuum interrupter 1F are designed such that fixed-side reversal extension part 87*a* and movable-side reversal extension part 87*b* respectively axially overlap with arc shield fixed-side extension 2*a* and arc shield movable-side extension 2*b* that respectively form pairs of opposite shields with fixed-side auxiliary shield 8Fa and movable-side auxiliary shield 8Fb. This serves to secure sufficient distances between opposite tips and thereby facilitate suppression of creeping discharge, and simultaneously serves to increase overlap regions between adjacent shields (e.g., between fixed-side reversal extension part 87*a* and arc shield fixed-side extension 2*a*) and thereby facilitate increase of the grounding-side resultant capacitance and the high-voltage-side resultant capacitance.

Seventh Embodiment

Figure 11:
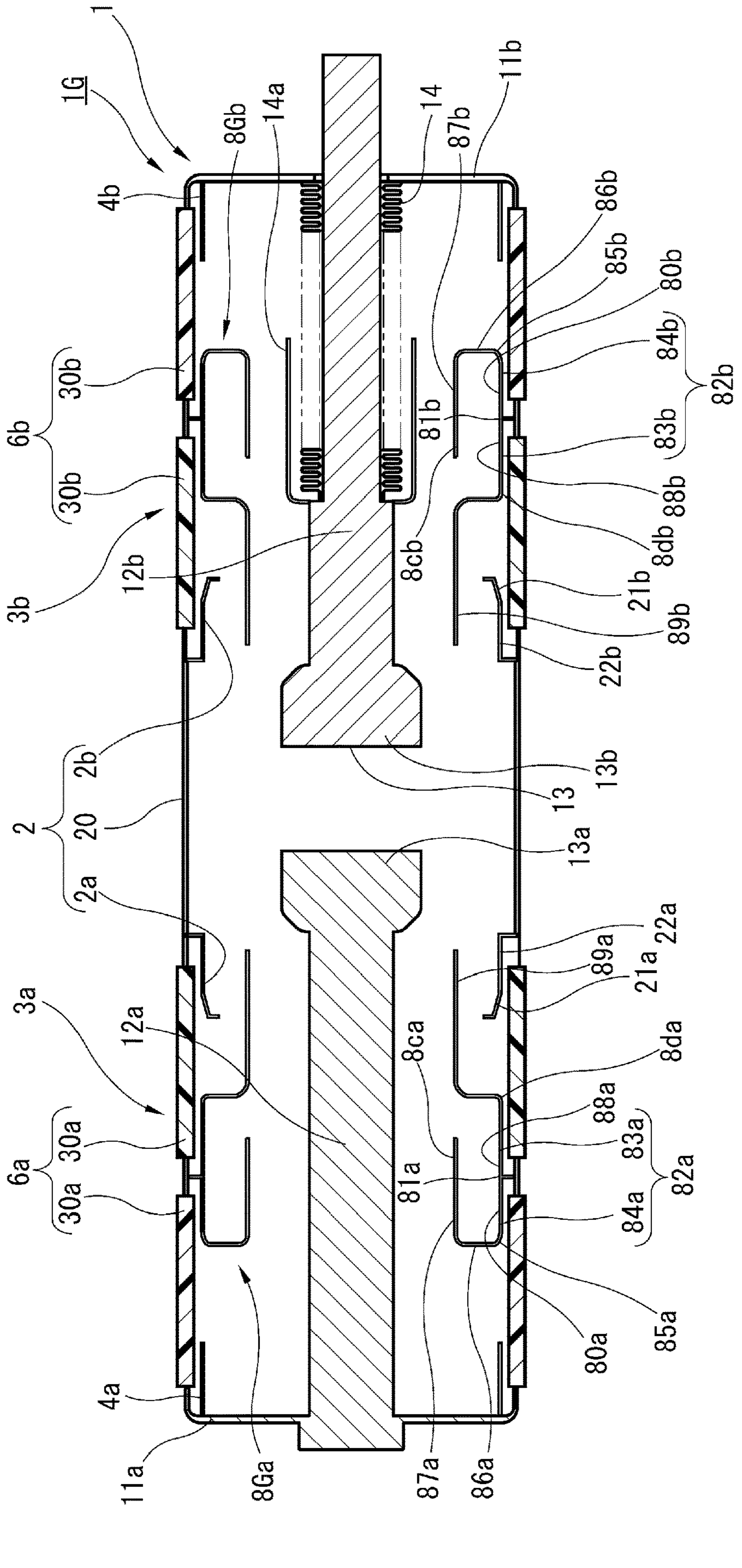
FIG. 11 is a schematic view illustrating configurations of a vacuum interrupter 1G according to a seventh embodiment, which is a longitudinal sectional view of vacuum interrupter 1G in the axial direction of vacuum container 1 (i.e., a right-and-left direction in the drawing).
Figure 12:
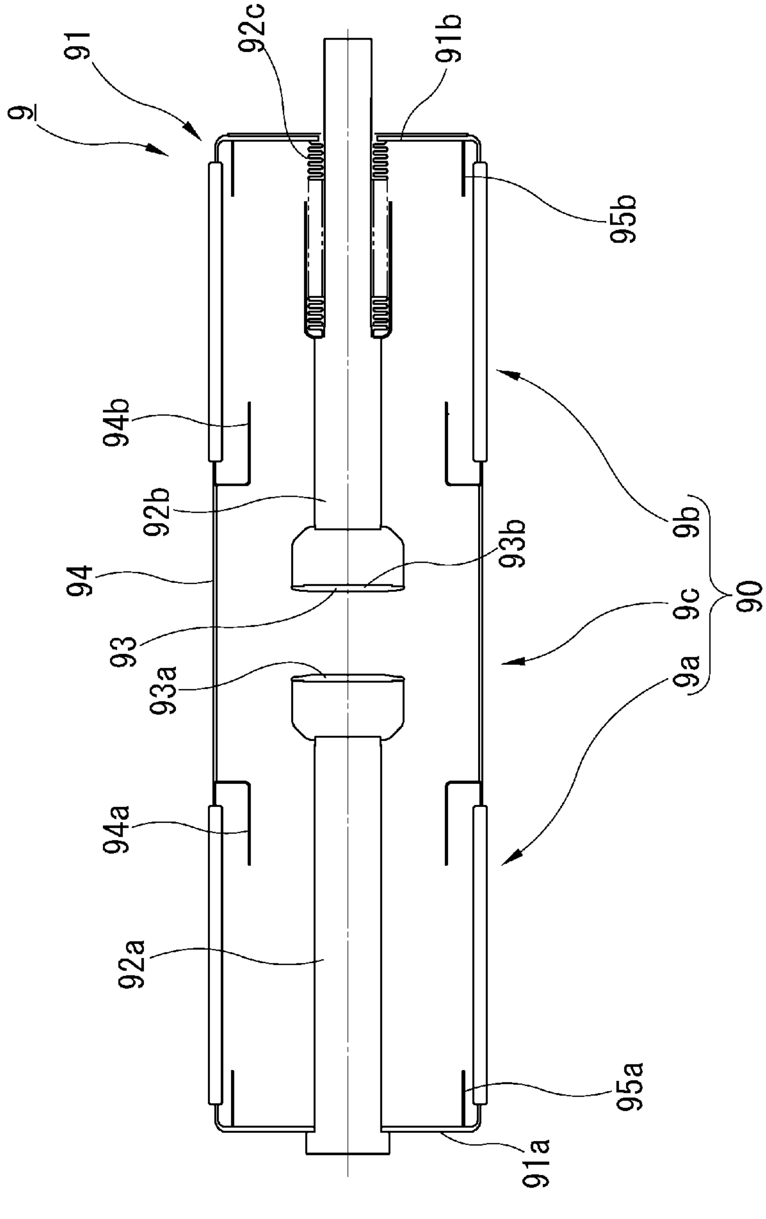
FIG. 12 is a schematic view illustrating an example of a common vacuum interrupter.

FIG. 11 illustrates schematic configurations of a vacuum interrupter 1G according to the seventh embodiment. Vacuum interrupter 1G is configured similarly to vacuum interrupter 1E, while including a fixed-side auxiliary shield 8Ga and a movable-side auxiliary shield 8Gb respectively instead of fixed-side auxiliary shield 8Ea and movable-side auxiliary shield 8Eb.

Specifically, fixed-side auxiliary shield 8Ga is configured similarly to fixed-side auxiliary shield 8Ea, while fixed-side auxiliary shield movable-side part 83*a* of fixed-side auxiliary shield 8Ga is shaped to decrease in diameter to form a step as going in an extending direction of fixed-side auxiliary shield movable-side part 83*a*. Fixed-side auxiliary shield movable-side part 83*a* of fixed-side auxiliary shield 8Ga includes in the extending direction a tip part 89*a*, a base part 88*a*, and an auxiliary shield diameter-decreasing part 8*da* between tip part 89*a* and base part 88*a*. Thus, tip part 89*a* is inserted in the inner circumferential side with respect to arc shield fixed-side extension 2*a*, and thereby overlaps with arc shield fixed-side extension 2*a* in the axial direction so as not to contact with it.

Movable-side auxiliary shield 8Gb is configured similarly to fixed-side auxiliary shield 8Ea, while movable-side auxiliary shield fixed-side part 83*b* of movable-side auxiliary shield 8Gb is shaped to decrease in diameter to form a step as going in an extending direction of movable-side auxiliary shield fixed-side part 83*b*. Movable-side auxiliary shield fixed-side part 83*b* of movable-side auxiliary shield 8Gb includes in the extending direction a tip part 89*b*, a base part 88*b*, and an auxiliary shield diameter-decreasing part 8*db* between tip part 89*b* and base part 88*b*. Thus, tip part 89*b* is inserted in the inner circumferential side with respect to arc shield movable-side extension 2*b*, and thereby overlaps with arc shield movable-side extension 2*b* in the axial direction so as not to contact with it.

Vacuum interrupter 1G according to the seventh embodiment described above exhibits the following effects in addition to the effects similar to the fifth embodiment. Each of fixed-side auxiliary shield movable-side part 83*a* of fixed-side auxiliary shield 8Ga and movable-side auxiliary shield fixed-side part 83*b* of movable-side auxiliary shield 8Gb is shaped to decrease in diameter to form a step as extending. This serves to secure sufficient distances between opposite tips and thereby suppress creeping discharge, and simultaneously serves to increase overlap regions between adjacent shields (e.g., between fixed-side reversal extension part 87*a* and arc shield fixed-side extension 2*a*) and thereby increase the grounding-side resultant capacitance and the high-voltage-side resultant capacitance, even in case of designing fixed-side auxiliary shield movable-side part 83*a* and movable-side auxiliary shield fixed-side part 83*b* to respectively axially overlap with arc shield fixed-side extension 2*a* and arc shield movable-side extension 2*b* that form pairs of adjacent shields with fixed-side auxiliary shield movable-side part 83*a* and movable-side auxiliary shield fixed-side part 83*b*.

The above merely details the specific embodiments of the present invention. As obvious to a person skilled in the art, these details may be variously modified within technical ideas of the present invention. Such modifications naturally belong to scope of the present claims.

For example, vacuum interrupters 1A to 1G are not limited to the configurations shown in the drawings, but may be modified to appropriately combine elements therein.

The number of insulator(s) 30*a* of fixed-side insulation section 3*a* and the number of insulator(s) 30*b* of movable-side insulation section 3*b* are not limited, but may be appropriately set.

As shown by vacuum interrupters 1A and 1D, the effects of suppressing creeping discharge and achieving an intended capacitance can be exhibited by appropriately setting distances between adjacent shields of various shields, provided that fixed-side insulation section 3*a* and movable-side insulation section 3*b* respectively include at least one insulator 30*a* and at least one insulator 30*b*.

In case of including fixed-side insulator group 6*a* and movable-side insulator group 6*b* as shown by vacuum interrupters 1B, 1C, 1E, 1F, and 1G, the number of insulators 30*a* and the number of insulators 30*b* may be appropriately set. However, it is favorable to set the number of insulators 30*a* of fixed-side insulator group 6*a* to be equal to or less than the number of insulators 30*b* of movable-side insulator group 6*b*.

Each of fixed-side adjustment shield 5*a* and movable-side adjustment shield 5*b* may be appropriately omitted or replaced with another member (e.g., a metallic member with a shape of a lead), depending on an intended capacitance of vacuum interrupter 1A, 1B, 1C, or 1D.

The invention claimed is:

1. A vacuum interrupter comprising:

a vacuum container including:

a tubular body being insulative; a fixed-side end and a movable-side end wherein fixed and movable sides are sides of first and second ends of the tubular body in an axial direction of the tubular body; and a fixed-side flange closing the fixed-side end and a movable-side flange closing the movable-side end;

a fixed-side conduction shaft extending in the axial direction from a center of the fixed-side flange inside the vacuum container;

a fixed electrode supported by an end of the fixed-side conduction shaft in an extending direction of the fixed-side conduction shaft;

a movable-side conduction shaft that extends in the axial direction through a center of the movable-side flange, and is supported inside the vacuum container by the movable-side flange via a bellows structured to be expandable, and is structured to be movable in the axial direction; and a movable electrode that is supported by an end of the movable-side conduction shaft inside the vacuum container so as to face the fixed electrode, and is structured to contact with and separate from the fixed electrode due to movement of the movable-side conduction shaft, wherein:

the tubular body includes:

an arc shield surrounding circumferences of the fixed electrode and the movable electrode;

a fixed-side insulation section shaped tubularly and coaxially connected to the arc shield from the fixed side in the axial direction; and a movable-side insulation section shaped tubularly and coaxially connected to the arc shield from the movable side in the axial direction;

the vacuum container includes:

a fixed-side electric field relaxation shield that is shaped tubularly, and extends from a rim of the fixed-side flange inside the vacuum container to the movable side in the axial direction along an inner periphery of the fixed-side insulation section; and a movable-side electric field relaxation shield that is shaped tubularly, and extends from a rim of the movable-side flange inside the vacuum container to the fixed side in the axial direction along an inner periphery of the movable-side insulation section;

the arc shield includes:

an arc shield body shaped tubularly and interposed between the fixed-side insulation section and the movable-side insulation section;

an arc shield fixed-side extension that is shaped tubularly, and extends from a fixed-side end of the arc shield body to the fixed side in the axial direction, along the inner periphery of the fixed-side insulation section; and an arc shield movable-side extension that is shaped tubularly, and extends from a movable-side end of the arc shield body to the movable side in the axial direction, along the inner periphery of the movable-side insulation section;

one of the arc shield fixed-side extension and the arc shield movable-side extension decreases in diameter to form a step as going in an extending direction of the one, and includes an arc shield diameter-decreasing part positioned apart from the arc shield body in the extending direction of the one in the axial direction;

the movable-side insulation section includes:

a movable-side insulator group including insulators shaped tubularly and arranged in series in the axial direction; and a movable-side auxiliary shield that is smaller in diameter than the movable-side insulator group, and is coaxial with the movable-side insulator group, and is supported between adjacent two of the insulators of the movable-side insulator group;

the movable-side auxiliary shield includes:

a movable-side auxiliary shield base part that is shaped annularly to extend in a circumferential direction along an inner periphery of the movable-side insulator group, and supports the movable-side auxiliary shield between the adjacent two of the insulators of the movable-side insulator group; and a movable-side auxiliary shield extension part that is shaped tubularly, and is coaxial with the movable-side auxiliary shield base part, and extends in the axial direction from the movable-side auxiliary shield base part;

the movable-side auxiliary shield extension part includes:

a movable-side auxiliary shield small diameter part that is shaped tubularly, and extends from an inner periphery of the movable-side auxiliary shield base part to the fixed side in the axial direction;

a movable-side auxiliary shield large diameter part that is shaped tubularly, and extends from a middle part of the movable-side auxiliary shield base part to the fixed side in the axial direction; and a movable-side auxiliary shield movable-side part that is shaped tubularly, and extends from the movable-side auxiliary shield base part to the movable side in the axial direction; and the movable-side auxiliary shield movable-side part decreases in diameter to form a step as going in an extending direction of the movable-side auxiliary shield movable-side part.

2. The vacuum interrupter as claimed in claim 1, wherein:

the fixed-side insulation section includes:

a fixed-side insulator group including insulators shaped tubularly and arranged in series in the axial direction; and a fixed-side auxiliary shield that is less in diameter than the fixed-side insulator group, and is coaxial with the fixed-side insulator group, and is supported between adjacent two of the insulators of the fixed-side insulator group;

the fixed-side auxiliary shield includes:

a fixed-side auxiliary shield base part that is shaped annularly to extend in the circumferential direction along an inner periphery of the fixed-side insulator group, and supports the fixed-side auxiliary shield between the adjacent two of the insulators of the fixed-side insulator group; and a fixed-side auxiliary shield extension part that is shaped tubularly, and is coaxial with the fixed-side auxiliary shield base part, and extends in the axial direction from the fixed-side auxiliary shield base part;

the fixed-side auxiliary shield extension part includes:

a fixed-side auxiliary shield small diameter part that is shaped tubularly, and extends from an inner periphery of the fixed-side auxiliary shield base part to the movable side in the axial direction;

a fixed-side auxiliary shield large diameter part that is shaped tubularly, and extends from a middle part of the fixed-side auxiliary shield base part to the movable side in the axial direction; and a fixed-side auxiliary shield fixed-side part that is shaped tubularly, and extends from the fixed-side auxiliary shield base part to the fixed side in the axial direction; and the insulators of the movable-side insulator group are equal to or greater in number than the insulators of the fixed-side insulator group.

3. The vacuum interrupter as claimed in claim 1, wherein the arc shield movable-side extension decreases in diameter to form the step as going in the extending direction of the arc shield movable-side extension, and includes a tip part in the extending direction that is inserted between an outer periphery of the movable-side auxiliary shield small diameter part and an inner periphery of the movable-side auxiliary shield large diameter part so as to overlap with the movable-side auxiliary shield small diameter part and the movable-side auxiliary shield large diameter part in the axial direction without contacting with them.

4. The vacuum interrupter as claimed in claim 1, wherein one of the arc shield fixed-side extension and the arc shield movable-side extension includes a plurality of the arc shield diameter-decreasing parts.

5. The vacuum interrupter as claimed in claim 1, wherein:

one of the arc shield fixed-side extension and the arc shield movable-side extension includes an end of a tip part in the extending direction thereof; and the end of the tip part is bent outwardly in a radial direction of the tubular body.

6. The vacuum interrupter as claimed in claim 1, wherein one of the fixed-side electric field relaxation shield and the movable-side electric field relaxation shield includes a tip part decreasing in diameter to form a step as going in an extending direction thereof and including an end bent inwardly or outwardly in the radial direction of the tubular body.

7. The vacuum interrupter as claimed in claim 1, wherein the vacuum container includes:

a fixed-side adjustment shield that is shaped tubularly, and is disposed between the fixed-side conduction shaft and the fixed-side electric field relaxation shield inside the vacuum container, and extends from the fixed-side flange to the movable side in the axial direction; and a movable-side adjustment shield that is shaped tubularly, and is disposed between the movable-side conduction shaft and the movable-side electric field relaxation shield inside the vacuum container, and extends from the movable-side flange to the fixed side in the axial direction.

8. The vacuum interrupter as claimed in claim 7, wherein one of the fixed-side adjustment shield and the movable-side adjustment shield increases in diameter to form a step as going in an extending direction thereof.

9. A vacuum interrupter comprising:

a vacuum container including:

a tubular body being insulative; a fixed-side end and a movable-side end wherein fixed and movable sides are sides of first and second ends of the tubular body in an axial direction of the tubular body; and a fixed-side flange closing the fixed-side end and a movable-side flange closing the movable-side end;

a fixed-side conduction shaft extending in the axial direction from a center of the fixed-side flange inside the vacuum container;

a fixed electrode supported by an end of the fixed-side conduction shaft in an extending direction of the fixed-side conduction shaft;

a movable-side conduction shaft that extends in the axial direction through a center of the movable-side flange, and is supported inside the vacuum container by the movable-side flange via a bellows structured to be expandable, and is structured to be movable in the axial direction; and a movable electrode that is supported by an end of the movable-side conduction shaft inside the vacuum container so as to face the fixed electrode, and is structured to contact with and separate from the fixed electrode due to movement of the movable-side conduction shaft, wherein:

the tubular body includes:

an arc shield surrounding circumferences of the fixed electrode and the movable electrode;

a fixed-side insulation section shaped tubularly and coaxially connected to the arc shield from the fixed side in the axial direction; and a movable-side insulation section shaped tubularly and coaxially connected to the arc shield from the movable side in the axial direction;

the vacuum container includes:

a fixed-side electric field relaxation shield that is shaped tubularly, and extends from a rim of the fixed-side flange inside the vacuum container to the movable side in the axial direction along an inner periphery of the fixed-side insulation section; and a movable-side electric field relaxation shield that is shaped tubularly, and extends from a rim of the movable-side flange inside the vacuum container to the fixed side in the axial direction along an inner periphery of the movable-side insulation section;

the arc shield includes:

an arc shield body shaped tubularly and interposed between the fixed-side insulation section and the movable-side insulation section;

an arc shield fixed-side extension that is shaped tubularly, and extends from a fixed-side end of the arc shield body to the fixed side in the axial direction, along the inner periphery of the fixed-side insulation section; and an arc shield movable-side extension that is shaped tubularly, and extends from a movable-side end of the arc shield body to the movable side in the axial direction, along the inner periphery of the movable-side insulation section; and one of the arc shield fixed-side extension and the arc shield movable-side extension decreases in diameter to form a step as going in an extending direction of the one, and includes an arc shield diameter-decreasing part positioned apart from the arc shield body in the extending direction of the one in the axial direction;

the fixed-side insulation section includes:

a fixed-side insulator group including insulators shaped tubularly and arranged in series in the axial direction; and a fixed-side auxiliary shield that is smaller in diameter than the fixed-side insulator group, and is coaxial with the fixed-side insulator group, and is supported between adjacent two of the insulators of the fixed-side insulator group;

the fixed-side auxiliary shield includes:

a fixed-side auxiliary shield base part that is shaped annularly to extend in a circumferential direction along an inner periphery of the fixed-side insulator group, and supports the fixed-side auxiliary shield between the adjacent two of the insulators of the fixed-side insulator group; and a fixed-side auxiliary shield extension part that is shaped tubularly, and is coaxial with the fixed-side auxiliary shield base part, and extends in the axial direction from the fixed-side auxiliary shield base part; and the fixed-side auxiliary shield extension part includes:

a fixed-side auxiliary shield small diameter part that is shaped tubularly, and extends from an inner periphery of the fixed-side auxiliary shield base part to the movable side in the axial direction;

a fixed-side auxiliary shield large diameter part that is shaped tubularly, and extends from a middle part of the fixed-side auxiliary shield base part to the movable side in the axial direction;

a fixed-side auxiliary shield fixed-side part that is shaped tubularly, and extends from the fixed-side auxiliary shield base part to the fixed side in the axial direction; and the fixed-side auxiliary shield fixed-side part decreases in diameter to form a step as going in an extending direction of the fixed-side auxiliary shield fixed-side part.

10. The vacuum interrupter as claimed in claim 9, wherein the arc shield fixed-side extension decreases in diameter to form the step as going in the extending direction of the arc shield fixed-side extension, and includes a tip part in the extending direction that is inserted between an outer periphery of the fixed-side auxiliary shield small diameter part and an inner periphery of the fixed-side auxiliary shield large diameter part so as to overlap with the fixed-side auxiliary shield small diameter part and the fixed-side auxiliary shield large diameter part in the axial direction without contacting with them.

11. A vacuum interrupter comprising:

a vacuum container including:

a tubular body being insulative; a fixed-side end and a movable-side end wherein fixed and movable sides are sides of first and second ends of the tubular body in an axial direction of the tubular body; and a fixed-side flange closing the fixed-side end and a movable-side flange closing the movable-side end;

a fixed-side conduction shaft extending in the axial direction from a center of the fixed-side flange inside the vacuum container;

a fixed electrode supported by an end of the fixed-side conduction shaft in an extending direction of the fixed-side conduction shaft;

a movable-side conduction shaft that extends in the axial direction through a center of the movable-side flange, and is supported inside the vacuum container by the movable-side flange via a bellows structured to be expandable, and is structured to be movable in the axial direction; and a movable electrode that is supported by an end of the movable-side conduction shaft inside the vacuum container so as to face the fixed electrode, and is structured to contact with and separate from the fixed electrode due to movement of the movable-side conduction shaft, wherein:

the tubular body includes:

an arc shield surrounding circumferences of the fixed electrode and the movable electrode;

a fixed-side insulation section shaped tubularly and coaxially connected to the arc shield from the fixed side in the axial direction; and a movable-side insulation section shaped tubularly and coaxially connected to the arc shield from the movable side in the axial direction;

the vacuum container includes:

a fixed-side electric field relaxation shield that is shaped tubularly, and extends from a rim of the fixed-side flange inside the vacuum container to the movable side in the axial direction along an inner periphery of the fixed-side insulation section; and a movable-side electric field relaxation shield that is shaped tubularly, and extends from a rim of the movable-side flange inside the vacuum container to the fixed side in the axial direction along an inner periphery of the movable-side insulation section;

the arc shield includes:

an arc shield body shaped tubularly and interposed between the fixed-side insulation section and the movable-side insulation section;

an arc shield fixed-side extension that is shaped tubularly, and extends from a fixed-side end of the arc shield body to the fixed side in the axial direction, along the inner periphery of the fixed-side insulation section; and an arc shield movable-side extension that is shaped tubularly, and extends from a movable-side end of the arc shield body to the movable side in the axial direction, along the inner periphery of the movable-side insulation section;

the movable-side insulation section includes:

a movable-side insulator group including insulators shaped tubularly and arranged in series in the axial direction; and a movable-side auxiliary shield that is smaller in diameter than the movable-side insulator group, and is coaxial with the movable-side insulator group, and is supported between adjacent two of the insulators of the movable-side insulator group;

the movable-side auxiliary shield includes:

a movable-side auxiliary shield base part that is shaped annularly to extend in a circumferential direction along an inner periphery of the movable-side insulator group, and supports the movable-side auxiliary shield between the adjacent two of the insulators of the movable-side insulator group; and a movable-side auxiliary shield extension part that is shaped tubularly, and is coaxial with the movable-side auxiliary shield base part, and extends in the axial direction from the movable-side auxiliary shield base part;

the movable-side auxiliary shield extension part includes:

a movable-side auxiliary shield fixed-side part that is shaped tubularly, and extends from the movable-side auxiliary shield base part to the fixed side in the axial direction; and a movable-side auxiliary shield movable-side part that is shaped tubularly, and extends from the movable-side auxiliary shield base part to the movable side in the axial direction; and the movable-side auxiliary shield movable-side part includes a tip part directed to the movable side in the axial direction, wherein the tip part directed to the movable side includes:

a movable-side diameter-decreasing part that is bent inwardly in a radial direction of the tubular body from the tip part directed to the movable side, and is shaped annularly, and extends in the circumferential direction along an inner periphery of the tip part directed to the movable side; and a movable-side reversal extension part that is shaped tubularly, and extends from an inner periphery of the movable-side diameter-decreasing part to the fixed side in the axial direction, wherein the movable-side reversal extension part includes a tip part directed to the fixed side in the axial direction and inserted in an inner circumferential side with respect to the arc shield movable-side extension so as to overlap with the arc shield movable-side extension in the axial direction without contacting with the arc shield movable-side extension.

12. A vacuum interrupter comprising:

a vacuum container including:

a tubular body being insulative; a fixed-side end and a movable-side end wherein fixed and movable sides are sides of first and second ends of the tubular body in an axial direction of the tubular body; and a fixed-side flange closing the fixed-side end and a movable-side flange closing the movable-side end;

a fixed-side conduction shaft extending in the axial direction from a center of the fixed-side flange inside the vacuum container;

a fixed electrode supported by an end of the fixed-side conduction shaft in an extending direction of the fixed-side conduction shaft;

a movable-side conduction shaft that extends in the axial direction through a center of the movable-side flange, and is supported inside the vacuum container by the movable-side flange via a bellows structured to be expandable, and is structured to be movable in the axial direction; and a movable electrode that is supported by an end of the movable-side conduction shaft inside the vacuum container so as to face the fixed electrode, and is structured to contact with and separate from the fixed electrode due to movement of the movable-side conduction shaft, wherein:

the tubular body includes:

an arc shield surrounding circumferences of the fixed electrode and the movable electrode;

a fixed-side insulation section shaped tubularly and coaxially connected to the arc shield from the fixed side in the axial direction; and a movable-side insulation section shaped tubularly and coaxially connected to the arc shield from the movable side in the axial direction;

the vacuum container includes:

a fixed-side electric field relaxation shield that is shaped tubularly, and extends from a rim of the fixed-side flange inside the vacuum container to the movable side in the axial direction along an inner periphery of the fixed-side insulation section; and a movable-side electric field relaxation shield that is shaped tubularly, and extends from a rim of the movable-side flange inside the vacuum container to the fixed side in the axial direction along an inner periphery of the movable-side insulation section;

the arc shield includes:

an arc shield body shaped tubularly and interposed between the fixed-side insulation section and the movable-side insulation section;

an arc shield fixed-side extension that is shaped tubularly, and extends from a fixed-side end of the arc shield body to the fixed side in the axial direction, along the inner periphery of the fixed-side insulation section; and an arc shield movable-side extension that is shaped tubularly, and extends from a movable-side end of the arc shield body to the movable side in the axial direction, along the inner periphery of the movable-side insulation section;

the fixed-side insulation section includes:

a fixed-side insulator group including insulators shaped tubularly and arranged in series in the axial direction; and a fixed-side auxiliary shield that is smaller in diameter than the fixed-side insulator group, and is coaxial with the fixed-side insulator group, and is supported between adjacent two of the insulators of the fixed-side insulator group;

the fixed-side auxiliary shield includes:

a fixed-side auxiliary shield base part that is shaped annularly to extend in a circumferential direction along an inner periphery of the fixed-side insulator group, and supports the fixed-side auxiliary shield between the adjacent two of the insulators of the fixed-side insulator group; and a fixed-side auxiliary shield extension part that is shaped tubularly, and is coaxial with the fixed-side auxiliary shield base part, and extends in the axial direction from the fixed-side auxiliary shield base part; and the fixed-side auxiliary shield extension part includes:

a fixed-side auxiliary shield movable-side part that is shaped tubularly, and extends from the fixed-side auxiliary shield base part to the movable side in the axial direction; and a fixed-side auxiliary shield fixed-side part that is shaped tubularly, and extends from the fixed-side auxiliary shield base part to the fixed side in the axial direction; and the fixed-side auxiliary shield fixed-side part includes a tip part directed to the fixed side in the axial direction, wherein the tip part directed to the fixed side includes:

a fixed-side diameter-decreasing part that is bent inwardly in a radial direction of the tubular body from the tip part directed to the fixed side, and is shaped annularly, and extends in the circumferential direction along an inner periphery of the tip part directed to the fixed side; and a fixed-side reversal extension part that is shaped tubularly, and extends from an inner periphery of the fixed-side diameter-decreasing part to the movable side in the axial direction, wherein the fixed-side reversal extension part includes a tip part directed to the movable side in the axial direction and inserted in an inner circumferential side with respect to the arc shield fixed-side extension so as to overlap with the arc shield fixed-side extension in the axial direction without contacting with the arc shield fixed-side extension.

13. A vacuum interrupter comprising:

a vacuum container including:

a tubular body being insulative; a fixed-side end and a movable-side end wherein fixed and movable sides are sides of first and second ends of the tubular body in an axial direction of the tubular body; and a fixed-side flange closing the fixed-side end and a movable-side flange closing the movable-side end;

a fixed-side conduction shaft extending in the axial direction from a center of the fixed-side flange inside the vacuum container;

a fixed electrode supported by an end of the fixed-side conduction shaft in an extending direction of the fixed-side conduction shaft;

a movable-side conduction shaft that extends in the axial direction through a center of the movable-side flange, and is supported inside the vacuum container by the movable-side flange via a bellows structured to be expandable, and is structured to be movable in the axial direction; and a movable electrode that is supported by an end of the movable-side conduction shaft inside the vacuum container so as to face the fixed electrode, and is structured to contact with and separate from the fixed electrode due to movement of the movable-side conduction shaft, wherein:

the tubular body includes:

an arc shield surrounding circumferences of the fixed electrode and the movable electrode;

a fixed-side insulation section shaped tubularly and coaxially connected to the arc shield from the fixed side in the axial direction; and a movable-side insulation section shaped tubularly and coaxially connected to the arc shield from the movable side in the axial direction;

the vacuum container includes:

a fixed-side electric field relaxation shield that is shaped tubularly, and extends from a rim of the fixed-side flange inside the vacuum container to the movable side in the axial direction along an inner periphery of the fixed-side insulation section; and a movable-side electric field relaxation shield that is shaped tubularly, and extends from a rim of the movable-side flange inside the vacuum container to the fixed side in the axial direction along an inner periphery of the movable-side insulation section;

the arc shield includes:

an arc shield body shaped tubularly and interposed between the fixed-side insulation section and the movable-side insulation section;

an arc shield fixed-side extension that is shaped tubularly, and extends from a fixed-side end of the arc shield body to the fixed side in the axial direction, along the inner periphery of the fixed-side insulation section; and an arc shield movable-side extension that is shaped tubularly, and extends from a movable-side end of the arc shield body to the movable side in the axial direction, along the inner periphery of the movable-side insulation section;

the movable-side insulation section includes:

a movable-side insulator group including insulators shaped tubularly and arranged in series in the axial direction; and a movable-side auxiliary shield that is smaller in diameter than the movable-side insulator group, and is coaxial with the movable-side insulator group, and is supported between adjacent two of the insulators of the movable-side insulator group;

the movable-side auxiliary shield includes:

a movable-side auxiliary shield base part that is shaped annularly to extend in a circumferential direction along an inner periphery of the movable-side insulator group, and supports the movable-side auxiliary shield between the adjacent two of the insulators of the movable-side insulator group; and a movable-side auxiliary shield extension part that is shaped tubularly, and is coaxial with the movable-side auxiliary shield base part, and extends in the axial direction from the movable-side auxiliary shield base part;

the movable-side auxiliary shield extension part includes:

a movable-side auxiliary shield fixed-side part that is shaped tubularly, and extends from the movable-side auxiliary shield base part to the fixed side in the axial direction; and a movable-side auxiliary shield movable-side part that is shaped tubularly, and extends from the movable-side auxiliary shield base part to the movable side in the axial direction; and the movable-side auxiliary shield movable-side part includes a tip part directed to the movable side in the axial direction, wherein the tip part directed to the movable side includes:

a movable-side diameter-decreasing part that is bent inwardly in a radial direction of the tubular body from the tip part directed to the movable side, and is shaped annularly, and extends in the circumferential direction along an inner periphery of the tip part directed to the movable side; and a movable-side reversal extension part that is shaped tubularly, and extends from an inner periphery of the movable-side diameter-decreasing part to the fixed side in the axial direction, wherein the movable-side auxiliary shield fixed-side part decreases in diameter to form a step as going in an extending direction of the movable-side auxiliary shield fixed-side part, and includes a tip part in the extending direction that is inserted in an inner peripheral side with respect to the arc shield movable-side extension so as to overlap with the arc shield movable-side extension in the axial direction without contacting with the arc shield movable-side extension.

14. A vacuum interrupter comprising:

a vacuum container including:

a tubular body being insulative; a fixed-side end and a movable-side end wherein fixed and movable sides are sides of first and second ends of the tubular body in an axial direction of the tubular body; and a fixed-side flange closing the fixed-side end and a movable-side flange closing the movable-side end;

a fixed-side conduction shaft extending in the axial direction from a center of the fixed-side flange inside the vacuum container;

a fixed electrode supported by an end of the fixed-side conduction shaft in an extending direction of the fixed-side conduction shaft;

a movable-side conduction shaft that extends in the axial direction through a center of the movable-side flange, and is supported inside the vacuum container by the movable-side flange via a bellows structured to be expandable, and is structured to be movable in the axial direction; and a movable electrode that is supported by an end of the movable-side conduction shaft inside the vacuum container so as to face the fixed electrode, and is structured to contact with and separate from the fixed electrode due to movement of the movable-side conduction shaft, wherein:

the tubular body includes:

an arc shield surrounding circumferences of the fixed electrode and the movable electrode;

a fixed-side insulation section shaped tubularly and coaxially connected to the arc shield from the fixed side in the axial direction; and a movable-side insulation section shaped tubularly and coaxially connected to the arc shield from the movable side in the axial direction;

the vacuum container includes:

a fixed-side electric field relaxation shield that is shaped tubularly, and extends from a rim of the fixed-side flange inside the vacuum container to the movable side in the axial direction along an inner periphery of the fixed-side insulation section; and a movable-side electric field relaxation shield that is shaped tubularly, and extends from a rim of the movable-side flange inside the vacuum container to the fixed side in the axial direction along an inner periphery of the movable-side insulation section;

the arc shield includes:

an arc shield body shaped tubularly and interposed between the fixed-side insulation section and the movable-side insulation section;

an arc shield fixed-side extension that is shaped tubularly, and extends from a fixed-side end of the arc shield body to the fixed side in the axial direction, along the inner periphery of the fixed-side insulation section; and an arc shield movable-side extension that is shaped tubularly, and extends from a movable-side end of the arc shield body to the movable side in the axial direction, along the inner periphery of the movable-side insulation section;

the fixed-side insulation section includes:

a fixed-side insulator group including insulators shaped tubularly and arranged in series in the axial direction; and a fixed-side auxiliary shield that is smaller in diameter than the fixed-side insulator group, and is coaxial with the fixed-side insulator group, and is supported between adjacent two of the insulators of the fixed-side insulator group;

the fixed-side auxiliary shield includes:

a fixed-side auxiliary shield base part that is shaped annularly to extend in a circumferential direction along an inner periphery of the fixed-side insulator group, and supports the fixed-side auxiliary shield between the adjacent two of the insulators of the fixed-side insulator group; and a fixed-side auxiliary shield extension part that is shaped tubularly, and is coaxial with the fixed-side auxiliary shield base part, and extends in the axial direction from the fixed-side auxiliary shield base part; and the fixed-side auxiliary shield extension part includes:

a fixed-side auxiliary shield movable-side part that is shaped tubularly, and extends from the fixed-side auxiliary shield base part to the movable side in the axial direction; and a fixed-side auxiliary shield fixed-side part that is shaped tubularly, and extends from the fixed-side auxiliary shield base part to the fixed side in the axial direction; and the fixed-side auxiliary shield fixed-side part includes a tip part directed to the fixed side in the axial direction, wherein the tip part directed to the fixed side includes:

a fixed-side diameter-decreasing part that is bent inwardly in a radial direction of the tubular body from the tip part directed to the fixed side, and is shaped annularly, and extends in the circumferential direction along an inner periphery of the tip part directed to the fixed side; and a fixed-side reversal extension part that is shaped tubularly, and extends from an inner periphery of the fixed-side diameter-decreasing part to the movable side in the axial direction, wherein the fixed-side auxiliary shield movable-side part decreases in diameter to form a step as going in an extending direction of the fixed-side auxiliary shield movable-side part, and includes a tip part in the extending direction that is inserted in an inner peripheral side with respect to the arc shield fixed-side extension so as to overlap with the arc shield fixed-side extension in the axial direction without contacting with the arc shield fixed-side extension.

* * * * *